United States Patent
Kawashima

(10) Patent No.: US 11,107,097 B2
(45) Date of Patent: Aug. 31, 2021

(54) SYSTEM AND METHOD FOR COMPLETING TREND MAPPING USING SIMILARITY SCORING

(71) Applicant: Honda Motor Co., Ltd., Tokyo (JP)

(72) Inventor: Kiyotaka Kawashima, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 168 days.

(21) Appl. No.: 16/554,911

(22) Filed: Aug. 29, 2019

(65) Prior Publication Data

US 2021/0065224 A1 Mar. 4, 2021

(51) Int. Cl.
| G06Q 30/02 | (2012.01) |
| B60W 40/08 | (2012.01) |
| B60W 40/12 | (2012.01) |
| G07C 5/00 | (2006.01) |
| B60W 40/10 | (2012.01) |

(52) U.S. Cl.
CPC ......... *G06Q 30/0204* (2013.01); *B60W 40/08* (2013.01); *B60W 40/10* (2013.01); *B60W 40/12* (2013.01); *G06Q 30/0201* (2013.01); *G07C 5/008* (2013.01)

(58) Field of Classification Search
CPC ...... B60W 40/08; B60W 40/12; B60W 40/10; G06Q 30/0201; G07C 5/008
See application file for complete search history.

(56) References Cited

U.S. PATENT DOCUMENTS

| 7,739,142 | B2 | 6/2010 | Chand et al. |
| 9,361,624 | B2 | 6/2016 | Spears et al. |
| 9,916,594 | B2 | 3/2018 | Rane et al. |
| 10,579,932 | B1* | 3/2020 | Cantrell ................... G06F 17/18 |
| 2001/0003436 | A1* | 6/2001 | Yoshikawa .......... B60K 28/066 340/439 |
| 2005/0060220 | A1 | 3/2005 | Beringer |
| 2011/0040603 | A1* | 2/2011 | Wolfe ................ G06Q 30/0201 705/7.31 |
| 2013/0197971 | A1 | 8/2013 | Wilke |
| 2017/0169447 | A1 | 6/2017 | Hajian |
| 2018/0102938 | A1* | 4/2018 | Yoon ....................... G06F 17/40 |
| 2018/0121940 | A1 | 5/2018 | Fanelli et al. |
| 2018/0285925 | A1 | 10/2018 | Zackrone |

FOREIGN PATENT DOCUMENTS

| CN | 107248086 A | 10/2017 |
| CN | 107516246 A | 12/2017 |
| CN | 108256752 A | 7/2018 |
| JP | 5040637 B2 | 7/2012 |

* cited by examiner

*Primary Examiner* — Hongmin Fan
(74) *Attorney, Agent, or Firm* — Rankin, Hill & Clark LLP

(57) ABSTRACT

A system and method for completing trend mapping using similarity scoring that include receiving data associated with a vehicle and an occupant of the vehicle. The system and method also include analyzing the data associated with the vehicle and the occupant to determine at least one of: vehicle dynamic data, vehicle utilization data, and occupant demographic data. The system and method additionally include determining a center of gravity value of at least one of: the vehicle dynamic data, the vehicle utilization data, and the occupant demographic data. The system and method further include calculating a similarity score with respect to the center of gravity value for respective categories of at least one of: the vehicle dynamic data, the vehicle utilization data, and the occupant demographic data.

20 Claims, 13 Drawing Sheets

VEHICLE MODEL LINEUP: MODEL NAME ABC-123 — 312

| VIN | OCCUPANT AGE | OCCUPANT GENDER (F=1, M=2) | NUMBER OF HOUSEHOLD MEMBERS |
|---|---|---|---|
| XXXXX1 | 42 | 1 | 3 |
| XXXXX2 | 24 | 1 | 4 |
| XXXXX3 | 64 | 2 | 4 |
| XXXXX4 | 45 | 2 | 6 |
| XXXXX5 | 38 | 2 | 3 |
| XXXXX6 | 51 | 1 | 5 |
| XXXXX7 | 39 | 1 | 3 |
| XXXXX8 | 40 | 2 | 1 |

FIG. 3B

| VEHICLE MODEL LINEUP: MODEL NAME ABC-123 | | |
|---|---|---|
| VIN | NUMBER OF SPEED EVENTS ABOVE 65MPH | NUMBER OF BRAKING EVENTS ABOVE A PREDETERMINED BP THRESHOLD | NUMBER OF VEHICLE TRIPS |
| XXXXX1 | 42 | 1 | 114 |
| XXXXX2 | 24 | 12 | 167 |
| XXXXX3 | 64 | 2 | 312 |
| XXXXX4 | 45 | 14 | 245 |
| XXXXX5 | 38 | 2 | 96 |
| XXXXX6 | 51 | 18 | 368 |
| XXXXX7 | 39 | 1 | 210 |
| XXXXX8 | 40 | 10 | 259 |

FIG. 4B

| VEHICLE MODEL LINEUP: MODEL NAME ABC-123 — 512 | | |
|---|---|---|
| 518 | | 520 |
| VIN | NUMBER OF POIs VISITED THAT ARE WITHIN RESTAURANT CATEGORY | NUMBER OF INSTANCES PASSENGERS EQUAL TO OR ABOVE 2 | NUMBER OF VEHICLE TRIPS |
| XXXXX1 | 10 | 1 | 114 |
| XXXXX2 | 4 | 12 | 167 |
| XXXXX3 | 22 | 2 | 312 |
| XXXXX4 | 17 | 14 | 245 |
| XXXXX5 | 38 | 2 | 96 |
| XXXXX6 | 8 | 18 | 368 |
| XXXXX7 | 41 | 1 | 210 |
| XXXXX8 | 2 | 10 | 259 |

SYSTEM AND METHOD FOR COMPLETING TREND MAPPING USING SIMILARITY SCORING

BACKGROUND

Business entities invest many resources in demographic trending to plan for new products, determine potential use of current products, and/or to predict preferences with respect to current and future products. However, in many cases much of the data that is used to provide demographic trending is based on a subset of a population and/or a certain number of test subjects that may be part of a test group or test market. Such data may provide an estimate as to how perspective customers may use one or more products. However, these estimates may not provide real-world data that may be utilized to determine current real-world usage of products to complete real-time trend mapping of current product lineups.

BRIEF DESCRIPTION

According to one aspect, a computer-implemented method for completing trend mapping using similarity scoring that includes receiving data associated with a vehicle and an occupant of the vehicle. The computer-implemented method also includes analyzing the data associated with the vehicle and the occupant to determine at least one of: vehicle dynamic data, vehicle utilization data, and occupant demographic data and determining a center of gravity value of at least one of: the vehicle dynamic data, the vehicle utilization data, and the occupant demographic data. The computer-implemented method further includes calculating a similarity score with respect to the center of gravity value for respective categories of at least one of: the vehicle dynamic data, the vehicle utilization data, and the occupant demographic data. The center of gravity value and the similarity score are determined and calculated to complete the trend mapping.

According to another aspect, a system for completing trend mapping using similarity scoring that includes a memory storing instructions when executed by a processor cause the processor to receive data associated with a vehicle and an occupant of the vehicle. The instructions also cause the processor to analyze the data associated with the vehicle and the occupant to determine at least one of: vehicle dynamic data, vehicle utilization data, and occupant demographic data and determine a center of gravity value of at least one of: the vehicle dynamic data, the vehicle utilization data, and the occupant demographic data. The instructions further cause the processor to calculate a similarity score with respect to the center of gravity value for respective categories of at least one of: the vehicle dynamic data, the vehicle utilization data, and the occupant demographic data. The center of gravity value and the similarity score are determined and calculated to complete the trend mapping.

According to yet another aspect, a non-transitory computer readable storage medium storing instructions that when executed by a computer, which includes a processor perform a method that includes receiving data associated with a vehicle and an occupant of the vehicle. The computer-implemented method also includes analyzing the data associated with the vehicle and the occupant to determine at least one of: vehicle dynamic data, vehicle utilization data, and occupant demographic data and determining a center of gravity value of at least one of: the vehicle dynamic data, the vehicle utilization data, and the occupant demographic data. The computer-implemented method further includes calculating a similarity score with respect to the center of gravity value for respective categories of at least one of: the vehicle dynamic data, the vehicle utilization data, and the occupant demographic data. The center of gravity value and the similarity score are determined and calculated to complete trend mapping.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 3B is an illustrative example of a customer data set that is processed by the vehicle trend mapping application according to an exemplary embodiment of the present disclosure;

FIG. 4B is an illustrative example of a vehicle dynamic data set that is processed by the vehicle trend mapping application according to an exemplary embodiment of the present disclosure;

FIG. 5B is an illustrative example of a vehicle utilization data set that is processed by the vehicle trend mapping application according to an exemplary embodiment of the present disclosure;

DETAILED DESCRIPTION

Figure 1:
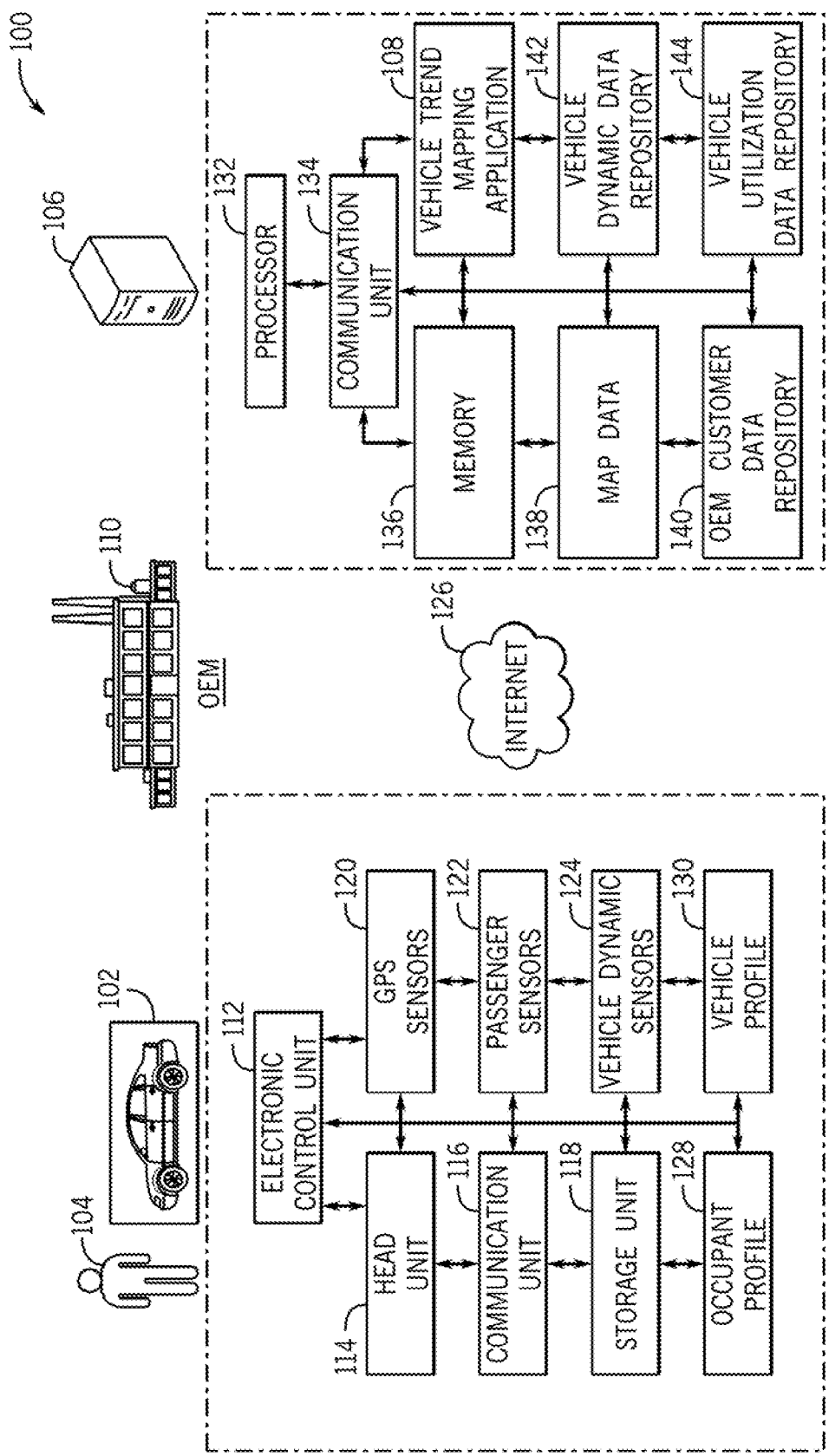
FIG. 1 is a schematic view of an exemplary operating environment for completing trend mapping using similarity scoring according to an exemplary embodiment of the present disclosure.

The following includes definitions of selected terms employed herein. The definitions include various examples and/or forms of components that fall within the scope of a term and that can be used for implementation. The examples are not intended to be limiting.

A "bus,' as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols such as Controller Area network (CAN), Media Oriented System Transport (MOST), Local Interconnect Network (LIN), among others.

"Computer communication," as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

An "input device," as used herein may include devices for controlling different vehicle features which include various vehicle components, systems, and subsystems. The term "input device" includes, but it not limited to: push buttons, rotary knobs, and the like. The term "input device" additionally includes graphical input controls that take place within a user interface which may be displayed by various types of mechanisms such as software and hardware based controls, interfaces, or plug and play devices.

A "memory," as used herein may include volatile memory and/or nonvolatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

A "module," as used herein, includes, but is not limited to, hardware, firmware, software in execution on a machine, and/or combinations of each to perform a function(s) or an action(s), and/or to cause a function or action from another module, method, and/or system. A module may include a software controlled microprocessor, a discrete logic circuit, an analog circuit, a digital circuit, a programmed logic device, a memory device containing executing instructions, and so on.

An "operable connection," as used herein may include a connection by which entities are "operably connected", is one in which signals, physical communications, and/or logical communications may be sent and/or received. An operable connection may include a physical interface, a data interface and/or an electrical interface.

An "output device," as used herein may include devices that may derive from vehicle components, systems, subsystems, and electronic devices. The term "output devices" includes, but is not limited to: display devices, and other devices for outputting information and functions.

A "processor," as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle," as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

A "vehicle system," as used herein may include, but are not limited to, any automatic or manual systems that may be used to enhance the vehicle, driving and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, among others.

I. System Overview

Referring now to the drawings, wherein the showings are for purposes of illustrating one or more exemplary embodiments and not for purposes of limiting the same, FIG. 1 is a schematic view of an exemplary operating environment 100 for completing trend mapping using similarity scoring according to an exemplary embodiment of the present disclosure. In an exemplary embodiment, the operating environment 100 may include one or more vehicles 102 that may be one or more of a plurality of vehicles that may be manufactured, sold, and/or leased by a particular vehicle manufacturer 110 (OEM). The vehicle(s) 102 may be owned, operated, and/or occupied by an occupant 104. Accordingly, the occupant 104 may include a driver of the vehicle(s) 102, an owner of the vehicle(s) 102, and/or a third-party that is occupying the vehicle(s) 102.

The vehicle(s) 102 may be configured as a particular vehicle model(s) (e.g., model name, model year) of a plurality of vehicle models that may be manufactured, sold, and/or leased by the OEM 110. The vehicle(s) 102 may additionally or alternatively be configured as a particular vehicle type (e.g., car, truck, SUV, coupe, sedan, etc.) of a plurality of vehicle types that may be manufactured, sold, and/or leased by the OEM 110. The vehicle(s) 102 additionally or alternatively may be configured based on an additional OEM classifications of a plurality of vehicle classifications that may be manufactured, sold, and/or leased by the OEM 110. For example, the plurality of vehicle classifications may include, but may not be limited to, a model trim level of the vehicle(s) 102, a model engine version of the vehicle(s) 102, and/or a body style of the vehicle(s) 102.

In one embodiment, the OEM 110 may own, operate, host, and/or access an OEM externally hosted server infrastructure (OEM server) 106 that may be utilized to send and receive data to and from the vehicle(s) 102 to determine data points that may be provided to the OEM 110 regarding vehicle dynamics and utilization information associated with the usage of the vehicle(s) 102 and demographics information associated with the occupant 104 of the vehicle(s) 102. As discussed in more detail below, the OEM server 106 and/or the vehicle(s) 102 may be configured to execute a vehicle trend mapping application 108 that may be configured to execute computer instructions to complete trend mapping using similarity scoring associated with the data that is received with respect the vehicle(s) 102 and/or the occupant 104 of the vehicle(s) 102.

In particular, the vehicle trend mapping application 108 may enable the completion of trend mapping on vehicle dynamic data associated with one or more dynamic categories of data (e.g., number of dynamic events related to trips, speed, acceleration, deceleration, braking, etc.) that may be received based on the dynamic operation of the vehicle(s) 102. The vehicle trend mapping application 108 may additionally enable the completion of trend mapping on vehicle utilization data (e.g., carrying a particular number of occupants, reaching a particular category of destination) that may be received based on the utilization of the vehicle(s) 102 by the occupant 104 of the vehicle(s) 102. Additionally, the vehicle trend mapping application 108 may enable the completion of trend mapping on occupant demographic data (e.g., age of the occupant, gender of the occupant, etc.) that may be associated with the occupant 104 of the vehicle(s) 102.

The vehicle trend mapping application 108 may be configured to utilize the data that may be used to map one or more trends that may be applicable to one or more vehicle model lineups of the plurality of vehicle models lineups, vehicle types, and/or additional OEM classifications of the plurality of vehicles that may be manufactured, sold, and/or leased by the OEM 110. In one embodiment, the one or more trends may be used for optimizing vehicle model lineups, vehicle types, and/or additional OEM classifications vehicles that may be manufactured, sold, and/or leased by the OEM 110 based on one or more iterations of a process that is executed by the vehicle trend mapping application 108.

As discussed in more detail below, the process may include the application 108 determining one or more center of gravity values and computing similarity scoring with respect to one or more center of gravity values to determine centric data points that may be associated with one or more categories of vehicle dynamic data, one or more categories of vehicle utilization data, and/or one or more categories of occupant demographic data. In one or more embodiments, the execution of the vehicle trend mapping application 108 may enable the OEM 110 to utilize trend mapping data with respect to the one or more centric data points to further determine overlapping trends that may indicate potential cannibalism between one or more vehicle models lineups, one or more vehicle types, and/or one or more additional OEM classifications of vehicles that may be manufactured, sold, and/or leased by the OEM 110.

This functionality may allow the OEM 110 to determine one or more vehicle model lineups, vehicle types, and/or additional OEM classifications of vehicles that may be consolidated, discontinued, and/or modified to ensure that the OEM 110 is utilizing resources towards current demographic trends, vehicle dynamic trends, and vehicle utilization trends of its customers that are utilizing one or more of the plurality of vehicle models vehicle types, and/or additional OEM classifications of vehicles that may be manufactured, sold, and/or leased by the OEM 110. Additionally, this functionally may allow the OEM 110 to determine one or more spaces in a market (e.g., market segment) based on the trend mapping data that may provide a potential opportunity to introduce one or more new or revised vehicle model lineups that may fulfill a need as determined based on the demographic trends, vehicle dynamic trends, and vehicle utilization trends determined by the application 108. Stated differently, the vehicle trend mapping application 108 may allow the OEM 110 to complete demographic trending, vehicle dynamic data trending, and vehicle utilization data trending to plan for new vehicle model lineups, determine real-time use of current vehicle model lineups, and/or to quantifiably estimate preferences with respect to current and future vehicle model lineups.

It is to be appreciated that although the present disclosure discusses the applicability of determining one or more center of gravity values and computing similarity scoring with respect to one or more values that may pertain the optimization of vehicle model lineups, vehicle types, and/or additional OEM classifications, in additional embodiments, the vehicle trend mapping application 108 may be utilized to determine one or more trends that may be utilized to determine alternative market trends that may or may not be associated with the plurality of vehicles and/or plurality of vehicle model lineups, plurality of vehicle types, and/or additional OEM classifications of vehicles that may be manufactured, sold, and/or leased by the OEM 110.

With reference to the one or more vehicles 102 of the plurality of vehicles that may be manufactured, sold, and/or leased by the OEM 110, a plurality components of the vehicle(s) 102 may be operably controlled by an electronic control unit (ECU) 112. The plurality of components of the vehicle(s) 102 that are operably controlled by the ECU 112 may include, but may not be limited to, a head unit 114, a communication unit 116, a storage unit 118, GPS sensors 120, passenger sensors 122, and vehicle dynamic sensors 124.

In an exemplary embodiment, the ECU 112 may be configured to execute one or more operating systems, vehicle system and subsystem executable instructions, sensor logic, and the like. In one or more embodiments, the ECU 112 may include a microprocessor, one or more application-specific integrated circuit(s) (ASIC), or other similar devices. The ECU 112 may also include respective internal processing memory, an interface circuit, and bus lines for transferring data, sending commands, and communicating with the plurality of components of the vehicle(s) 102. In one or more configurations, the ECU 112 may include a respective communication device (not shown) for sending data internally to components of the vehicle(s) 102 and communicating with externally hosted computing systems such as the OEM server 106 that are located external to the vehicle(s) 102 and are not physically connected to the vehicle(s) 102.

In one embodiment, the ECU 112 may be configured communicate one or more commands to the head unit 114 of the vehicle(s) 102. The head unit 114 may be configured to execute one or more application, application interfaces, and/or may communicate with one or more components of the vehicle(s) 102 to provide one or more interfaces to the one or more passengers within the vehicle(s) 102. In one embodiment, the head unit 114 may operably control and may be operably connected to a display unit (not shown) within the vehicle(s) 102. The display unit may include a display screen (not shown) that may be positioned upon a center stack console (not shown) of the vehicle(s) 102. However, in additional configurations, the display unit may be configured as one or more display screens that may be in one or more additional or alternative formats, including, but not limited to, a dash board display, a seat back/cushion display, a pop-up display, a head-up display, a head-mounted display, and a portable device display. In one or more embodiments, the head unit 114 may operably control the display unit to present one or more interfaces of the vehicle trend mapping application 108 to the occupant 104 seated within the vehicle(s) 102 to allow the occupant 104 to input occupant demographic data that may utilized by the application 108 to complete trend mapping.

In an exemplary embodiment, the communication unit 116 of the vehicle(s) 102 may communicate with one or more components of the operating environment 100 and/or additional systems and components outside of the operating environment 100. The communication unit 116 may include, but is not limited to, one or more transceivers (not shown) of the vehicle(s) 102 and additional components (not shown) that may be utilized for wired and wireless computer connections and communications via various protocols with one or more portable devices (not shown) that may be carried by the occupant 104 and may be within a (predetermined) communicable range with the communication unit 116 of the vehicle(s) 102. For example, the communication unit 116 may be utilized for wired and wireless computer connections that may include an active computer connection with the portable device(s) that may be previously paired to the vehicle(s) 102.

In one embodiment, the communication unit 116 may be configured to communicate data to the OEM server 106 and to receive data from the OEM server 106 through an internet cloud 126. As discussed below, the communication unit 116 may be configured to send vehicle dynamic data, vehicle locational data, vehicle occupancy data, and/or occupant demographic data to the OEM server 106. Such data may be analyzed, accessed, stored, and/or processed by the vehicle trend mapping application 108. For example, the communication unit 116 may be configured to send data pertaining to one or more vehicle dynamic parameters of the vehicle(s) 102 to be stored on the OEM server 106 and utilized by the application 108 to complete trend mapping.

In an exemplary embodiment, the storage unit 118 of the vehicle(s) 102 may be operably connected to the ECU 112 and the head unit 114. The ECU 112 and/or the head unit 114 may communicate with the storage unit 118 to execute one or more applications, operating systems, vehicle systems, and subsystem user interfaces, and the like that are stored on the storage unit 118. In one embodiment, the storage unit 118 may be configured to application executable data and application accessible data that may be utilized to execute the vehicle trend mapping application 108 and access data that may be processed, analyzed, and/or utilized by the vehicle trend mapping application 108.

In one or more embodiments, the storage unit 118 may be configured to store an occupant profile 128. The occupant profile 128 may be associated with the occupant 104 and may be configured to include one or more categories of occupant demographic data that may be associated with the occupant 104. The one or more categories of the demographic data may be populated within the occupant profile 128 stored on the storage unit 118 to enable the application 108 to process the data to determine one or more demographic data trends.

In one embodiment, the data associated with the one or more categories of the demographic data may be populated by the occupant 104 based on input of data to the one or more interfaces of the vehicle trend mapping application 108 provided to the occupant 104 seated within the vehicle(s) 102 though the display unit operably controlled by the head unit 114. In another embodiment, the data associated with the one or more categories of the demographic data may be populated by the occupant 104 based on input of data to the one or more interfaces of the vehicle trend mapping application 108 provided to the occupant 104 through a portable device(s) used by the occupant 104. The one or more interfaces may be presented during an initial usage period of the vehicle(s) 102 and/or may be presented based on a user input that may allow the occupant 104 to register themselves as the owner, driver, and/or a regular passenger of the vehicle(s) 102.

In some circumstances, the input of occupant demographic data may be utilized to provide warranty information, rebate information, recall information, sales promotions, third-party promotions, and the like to the occupant 104. Accordingly, the occupant 104 may be motivated to optionally input one or more categories of demographic data using the one or more interfaces of the application 108. In one or more embodiments, the categories of occupant demographic data may include, but may not be limited to, an age of the occupant 104, a gender of the occupant 104, a salary range of the occupant 104, a zip code of the occupant 104, a number of the household members of the occupant 104, and the like. It is to be appreciated that additional categories of occupant demographic data may be gathered with respect to the occupant 104 that may not be specifically disclosed herein.

Upon the occupant 104 providing the occupant demographic data, the vehicle trend mapping application 108 may be configured to populate an occupant profile 128 stored on the storage unit 118 with the one or more categories of occupant demographic data. As discussed below, the vehicle trend mapping application 108 may retrieve the one or more categories of occupant demographic data from the occupant profile 128 stored on the storage unit 118 along with occupant profiles stored on additional vehicles manufactured, sold, and/or leased by the OEM 110. Additionally, the vehicle trend mapping application 108 may populate one or more customer datasets that are classified based on one or more particular vehicle model lineups, vehicle types, and/or additional OEM classifications of vehicles with the one or more categories of occupant demographic data from the occupant profile 128 stored on the storage unit 118 along with occupant profiles stored on additional vehicles manufactured, sold, and/or leased by the OEM 110.

In an exemplary embodiment, the storage unit 118 may additionally store a vehicle profile 130. The vehicle profile 130 may be pre-populated by the OEM 110 to be updated with one or more categories of vehicle data that may pertain to the vehicle(s) 102. The one or more categories of vehicle data may include, but may not be limited to, a vehicle identification number (VIN) of the vehicle(s) 102, a model name of the vehicle(s) 102, a model year of the vehicle(s) 102, a vehicle type of the vehicle(s) 102, a model trim level of the vehicle(s) 102, a model engine version of the vehicle(s) 102, a body style of the vehicle(s) 102 and/or additional OEM specific vehicle identification information that may be utilized to describe and/or classify the vehicle(s) 102.

As discussed below, the vehicle trend mapping application 108 may retrieve the one or more categories of vehicle data from the vehicle profile 130 stored on the storage unit 118 along with vehicle profiles stored on additional vehicles manufactured, sold, and/or leased by the OEM 110. The vehicle trend mapping application 108 may classify one or more customer datasets, vehicle dynamic datasets, and/or vehicle utilization datasets based on one or more categories of vehicle data as a classification of the datasets. Accordingly, the one or more customer datasets, vehicle dynamic datasets, and/or vehicle utilization datasets may be classified based on one or more categories of vehicle data. For example, a customer dataset that may include one or more categories of occupant demographic data that may be collected from a plurality of vehicles may be classified as a dataset of customers who utilize a specific model lineup of vehicle(s) 102 (illustrative example shown in FIG. 3B).

With continued reference to the components of the vehicle(s) 102, the GPS sensors 120 may be configured as global positioning sensors that may be configured to output global positioning coordinates (GPS coordinates) to the ECU 112 and to the vehicle trend mapping application 108. In one embodiment, the GPS sensors 120 may communicate the GPS coordinates of one or more destinations visited by the vehicle(s) 102 (e.g., arrival to the destinations based on the determination of ignition off events) during a predetermined period of time (e.g., one week) to the vehicle trend mapping application 108. The application 108 may access and analyze map data 138 that may be stored the OEM server 106 to determine a category (e.g., point of interest category) of a destination location of the vehicle(s) 102.

In particular, the vehicle trend mapping application 108 may query the map data 138 using the GPS coordinates of the vehicle(s) 102 of the current geo-location of the vehicle(s) 102 when the ignition of the vehicle(s) 102 is determined to be disabled to determine respective destination categories of one or more destinations of the vehicle(s) 102. The destination categories of one or more destinations of the vehicle(s) 102 may include, but may not be limited to, home, work, restaurant, retailer, hotel, airport, hospital, shopping mall, etc. In one embodiment, the vehicle trend mapping application 108 may be configured to communicate with the GPS sensors 120 to determine one or more destination categories for a predetermined period of time (e.g., thirty days).

In one or more embodiments, the vehicle trend mapping application 108 may populate one or more vehicle utilization datasets (illustrative example shown in FIG. 5B) that are classified based on one or more particular vehicle model lineups, vehicle types, and/or additional OEM classifications of vehicles with the one or more destination categories in the form of numeric destination codes or one or more instances that one or more destination categories are visited by the vehicle(s) 102 that are communicated by the GPS sensors 120 of the vehicle(s) 102 and additional vehicles manufactured, sold, and/or leased by the OEM 110 to further process the one or more categories of vehicle utilization data.

In one or more embodiments, the passenger sensors 122 may be configured as cameras (not shown), seat sensors (not shown), door sensors (not shown), and the like that may be configured to determine a number of passengers that may occupy the vehicle(s) 102 during each trip of the vehicle(s) 102 over a predetermined period of time. In one or more embodiments, the vehicle trend mapping application 108 may communicate with the passenger sensors 122 and determine a number of instances where the number of passengers sensed within the vehicle(s) 102 meet or surpass a predetermined number of passengers that may occupy the vehicle(s) 102 for the predetermined period of time. In an exemplary embodiment, the vehicle trend mapping application 108 may populate one or more vehicle utilization datasets that are classified based on one or more particular vehicle model lineups, vehicle types, and/or additional OEM classifications of vehicles with the number of instances where the number of passengers sensed within the vehicle(s) 102 meet or surpass the predetermined number of passengers may occupy the vehicle(s) 102 for the predetermined period of time.

In an exemplary embodiment, the vehicle dynamic sensors 124 of the vehicle(s) 102 may be configured to output one or more categories of vehicle dynamic data to the ECU 112 and the vehicle trend mapping application 108. The vehicle dynamic sensors 124 may include, but may not be limited to, speed sensors, brake force sensors, steering speed sensors, steering angle sensors, throttle angle sensors, accelerometers, wheel speed sensors, wheel turning angle sensors, yaw rate sensors, transmission gear sensors, temperature sensors, RPM sensors, and the like (individual sensors not shown).

In one embodiment, the vehicle trend mapping application 108 may be configured to receive vehicle dynamic data for a predetermined period of time (e.g., one week) that may include, but may not be limited to, vehicle speed data, vehicle brake force data, vehicle steering speed data, vehicle steering angle data, vehicle throttle angle data, vehicle acceleration data, and the like. In one configuration, upon receiving the vehicle dynamic data, the vehicle trend mapping application 108 may analyze the vehicle data and may determine vehicle dynamic data.

In one configuration, the application 108 may be configured to compare the numerical values included within each category of vehicle dynamic data to subjective threshold values to determine a number of vehicle dynamic events that occur above, meet, and/or occur below the subjective threshold values. The number of vehicle dynamic events may include a number of events in one or more vehicle dynamic categories that may occur during a predetermined period of time. As an illustrative example, a subjective speed threshold value regarding reaching a speed of 60 MPH may be analyzed against the values of the vehicle speed data that may be captured during a predetermined period of one week to determine a number of speed events where the speed of the vehicle(s) 102 reaches or surpasses the subjective speed threshold value.

In one embodiment, upon determining the number of vehicle dynamic events (e.g., speed events) that occur above and/or below occur above, meet, and/or occur below the subjective threshold values, the vehicle trend mapping application 108 may output vehicle dynamic data that includes the number of vehicle dynamic events for one or more categories of vehicle dynamic data to populate one or more vehicle dynamic datasets (illustrative example shown in FIG. 4B) that are classified based on one or more particular vehicle model lineups, vehicle types, and/or additional OEM classifications of vehicles with vehicle dynamic data. Accordingly, the one or more vehicle dynamic datasets may be populated with vehicle dynamic data (e.g., the number of vehicle dynamic events) as determined by the application 108 for the vehicle(s) 102 and additional vehicles manufactured, sold, and/or leased by the OEM 110 to further process the one or more categories of vehicle dynamic data. As discussed below, numerical values included within the one or more vehicle dynamic dataset may be evaluated and processed to complete trend mapping of vehicle dynamic data with respect to one or more vehicle model lineups.

With particular reference to the OEM server 106, in an exemplary embodiment, the OEM server 106 may include a processor 132 that may operably control one or more components of the OEM server 106. In some configurations, the processor 132 may be configured to execute the vehicle trend mapping application 108. The processor 132 may be operably connected to a communication unit 134 of the OEM server 106. The communication unit 134 may include one or more network interface cards (not shown) that may be configured to connect to one or more computing systems through the internet cloud 126 including, but not limited to, the ECU 112 of the vehicle(s) 102. In one embodiment, the communication unit 134 may be configured to send and receive data through the internet cloud 126 with the communication unit 116 of the vehicle(s) 102 to facilitate the reception of one or more categories of occupant demographic data, vehicle dynamic data, and/or vehicle utilization data that may be analyzed by the application 108 to determine one or more categories of occupant demographic data, one or more categories of vehicle dynamic data, and/or one or more categories of vehicle utilization data.

In one configuration, the processor 132 may be operably connected to a memory 136 of the OEM server 106. The memory 136 may be configured to store data files associated with one or more applications, operating systems, vehicle systems, subsystem user interfaces, including but not limited to data files of the vehicle trend mapping application 108. In particular, the memory 136 may be configured to store the map data 138 that may be analyzed by the vehicle trend mapping application 108 to determine one or more destination categories of one or more destinations of the vehicle(s) 102.

In one embodiment, the map data 138 may include location data that may include geo-locational coordinates associated with one or more destination categories of corresponding locations. Such destination categories may be determined based on data that is continually updated by the OEM 110 or a third party entity to the map data 138 stored on the OEM server 106. The destination categories may additionally be determined based on navigation data provided by the occupant 104 using a navigation system (not shown) of the vehicle(s) 102 and/or a navigation application (not shown) that may be executed on the portable device used by the occupant 104. For example, points of interests stored as home, work, favorites, and the like by the occupant 104 may be populated within the map data 138.

In one configuration, upon determining the GPS coordinates of the vehicle(s) 102 once it is determined that the ignition of the vehicle(s) 102 has been disabled, the application 108 may be configured to compare the GPS coordinates of the vehicle(s) 102 and consequently of the destination of the vehicle(s) 102 and query the map data 138 stored on the memory 136 to determine the destination category of the destination. The vehicle trend mapping application 108 may thereby populate one or more vehicle utilization datasets that are classified based on one or more particular vehicle model lineups, vehicle types, and/or additional OEM classifications of vehicles with the one or more destination categories in the form of numeric destination category codes or one or more instances at which one or more destination categories are visited as determined based on data received from the GPS sensors 120 of the vehicle(s) 102.

In an exemplary embodiment, the memory 136 of the OEM server 106 may store an OEM customer data repository 140. The OEM customer data repository 140 may be configured as a relational database/data store that may include various records that may pertain to one or more categories of occupant demographic data for the occupant 104 of the vehicle(s) 102 and additional vehicles manufactured, sold, and/or leased by the OEM 110 to further process the one or more categories of occupant demographic data. In one embodiment, the vehicle trend mapping application 108 may be configured to store the one or more categories of occupant demographic data upon the OEM customer data repository 140 each time the application 108 retrieves such data from the occupant profile 128 stored on the storage unit 118 of the vehicle(s) 102.

Additionally, the vehicle trend mapping application 108 may be configured to access the OEM customer data repository 140 to retrieve one or more categories of occupant demographic data associated with the occupant 104 to populate one or more customer datasets that are classified based on one or more particular vehicle model lineups, vehicle types, and/or additional OEM classifications of vehicles. In particular the one or more customer datasets may be populated with the one or more categories of occupant demographic data from the vehicle(s) 102 and additional vehicles manufactured, sold, and/or leased by the OEM 110 that are retrieved from the OEM customer data repository 140 to further process trend mapping data pertaining to the one or more categories of vehicle dynamic data The memory 136 of the OEM server 106 may also store a vehicle dynamic data repository 142. The vehicle dynamic data repository 142 may be configured as a relational database/data store that may include various records that may pertain to one or more categories of vehicle dynamic data as determined based on the vehicle dynamic sensors 124 of the vehicle(s) 102 and additional vehicles manufactured, sold, and/or leased by the OEM 110. In one embodiment, the vehicle trend mapping application 108 may be configured to store the one or more categories of vehicle dynamic data upon the vehicle dynamic data repository 142 each time the application 108 retrieves such data from the vehicle dynamic sensors 124 of the vehicle(s) 102.

Additionally, the vehicle trend mapping application 108 may be configured to access the vehicle dynamic data repository 142 to retrieve one or more of categories of vehicle dynamic data associated with the vehicle(s) 102 and additional vehicles manufactured, sold, and/or leased by the OEM 110 to populate one or more vehicle dynamic datasets that are classified based on one or more particular vehicle model lineups, vehicle types, and/or additional OEM classifications of vehicles. In particular the one or more vehicle dynamic datasets may be populated with the one or more categories of vehicle dynamic data from the vehicle(s) 102 and additional vehicles manufactured, sold, and/or leased by the OEM 110 that are retrieved from the vehicle dynamic data repository 142 to further process trend mapping data pertaining to the one or more categories of vehicle dynamic data.

In one or more embodiments, the memory 136 may additionally store a vehicle utilization data repository 144. The vehicle utilization data repository 144 may be configured as a relational database/data store that may include various records that may pertain to one or more categories of vehicle utilization data as determined based on the GPS sensors 120 and/or the passenger sensors 122 of the vehicle(s) 102 and additional vehicles manufactured, sold, and/or leased by the OEM 110. In one embodiment, the vehicle trend mapping application 108 may be configured to store the one or more categories of vehicle utilization data upon the vehicle utilization data repository 144 each time the application 108 retrieves such data from the GPS sensors 120 and/or the passenger sensors 122 of the vehicle(s) 102.

Additionally, the vehicle trend mapping application 108 may be configured to access the vehicle utilization data repository 144 to retrieve one or more of categories of vehicle utilization data (e.g., destination categories, passenger information) associated with the vehicle(s) 102 and additional vehicles manufactured, sold, and/or leased by the OEM 110 to populate one or more vehicle utilization datasets that are classified based on one or more particular vehicle model lineups, vehicle types, and/or additional OEM classifications of vehicles. In particular the one or more vehicle utilization datasets may be populated with the one or more categories of vehicle utilization data from the vehicle(s) 102 and additional vehicles manufactured, sold, and/or leased by the OEM 110 that are retrieved from the vehicle utilization data repository 144 to further process trend mapping data pertaining to the one or more categories of vehicle utilization data.

II. The Vehicle Trend Mapping Application and Related Methods

The general functionality of the vehicle trend mapping application 108 will now be discussed in more detail with respect to exemplary methods that may be executed by the application 108. In one embodiment, the vehicle trend mapping application 108 may be fully or partially executed by the ECU 112 of the vehicle(s) 102. Additionally or alternatively, the vehicle trend mapping application 108 may be fully or partially executed by the processor 132 of the OEM server 106. The vehicle trend mapping application 108 may utilize the communication unit 116 of the vehicle(s) 102 and the communication unit 134 of the OEM server 106 to communicate application related data between the vehicle(s) 102 and the OEM server 106. In an alternate embodiment, the vehicle trend mapping application 108 may additionally be partially executed by a third-party computing infrastructure and/or the portable device used by the occupant 104.

Figure 2:
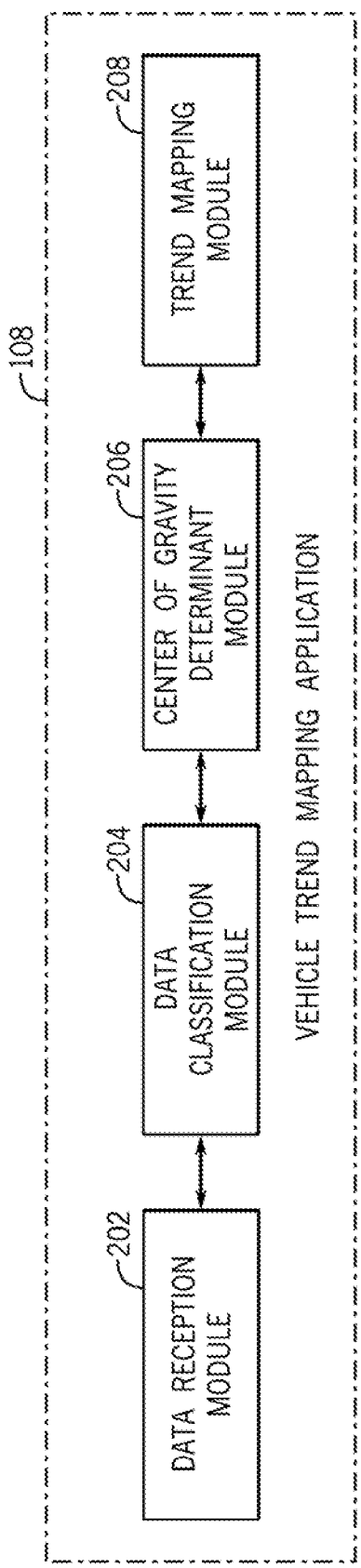
FIG. 2 is a schematic view of a plurality of modules of vehicle trend mapping application that may executed computer-implemented instructions for trend mapping using similarity scoring according to an exemplary embodiment of the present disclosure.

FIG. 2 is a schematic view of a plurality of modules 202-208 of the vehicle trend mapping application 108 that may executed computer-implemented instructions for trend mapping using similarity scoring according to an exemplary embodiment of the present disclosure. In an exemplary embodiment, the plurality of modules 202-208 may include a data reception module 202, a data classification module 204, a center of gravity determinant module (COG determinant module) 206, and a trend mapping module 208. It is to be appreciated that the vehicle trend mapping application 108 may include one or more additional modules and/or sub-modules that are included in addition to or in lieu of the modules 202-208.

In one or more embodiments, the data reception module 202 may be configured to communicate with one or more components of the vehicle(s) 102 to determine occupant demographic data, vehicle dynamic data, and/or vehicle utilization data after a predetermined period of time (e.g., cyclically after each predetermined period of time of one month). The data reception module 202 may accordingly update the OEM customer data repository 140, the vehicle dynamic data repository 142, and/or the vehicle utilization data repository 144 with the respective information for the vehicle(s) 102.

As discussed below, the data classification module 204 may be configured to query the OEM customer data repository 140, the vehicle dynamic data repository 142, and/or the vehicle utilization data repository 144 to retrieve occupant demographic data, vehicle dynamic data, and/or vehicle utilization data based on one or more particular vehicle model lineups, vehicle types, and/or additional OEM classifications. In one embodiment, the data classification module 204 may be configured to process one or more datasets (e.g., data tables) that are classified based on one or more particular vehicle model lineups, vehicle types, and/or additional OEM classifications of vehicles with the one or more categories of occupant demographic data, one or more categories of vehicle dynamic data, and one or more categories of vehicle utilization data that are respectively retrieved from the repositories 140, 142, 144 for a plurality of vehicles of the same classification (e.g., vehicle model lineup) that may be manufactured, sold, and/or leased by the OEM 110. Upon processing the one or more datasets, the data classification module 204 may communicate the data pertaining to the one or more datasets to the COG determinant module 206.

As discussed in more detail below, the COG determinant module 206 may be configured to calculate one or more center of gravity values for one or more categories of occupant demographic data, one or more categories of vehicle dynamic data, and one or more categories of vehicle utilization data for one or more classifications of one or more datasets. For example, the COG determinant module 206 may be configured to calculate one or more center of gravity values for one or more one or more categories of vehicle dynamic data for a particular classification of a particular vehicle model lineup. As discussed below, the COG determinant module 206 may be configured calculate a similarity score that indicates a similarity between one or more center of gravity values and additional data points or a percentile subset of additional data points that pertain to the one or more categories of occupant demographic data, one or more categories of vehicle dynamic data, and/or one or more categories of vehicle utilization data for one or more classifications of one or more datasets.

Figure 8:
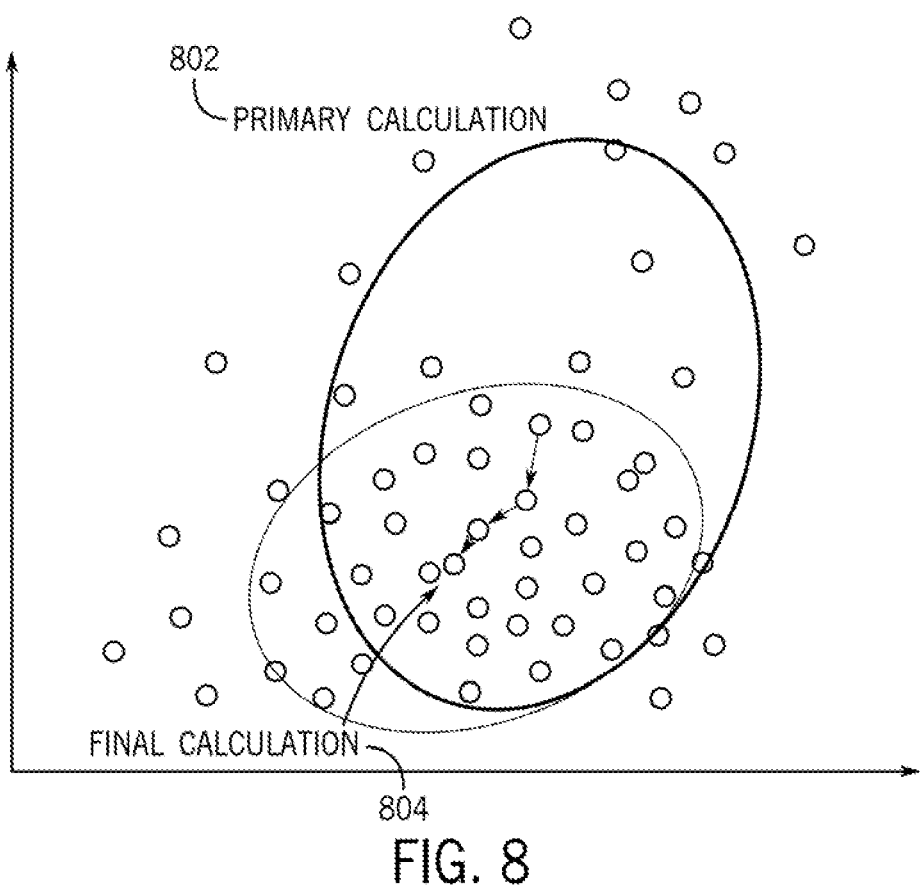
FIG. 8 is an illustrative example of shifting of center of gravity values from a primary center of gravity value to a more centric value of the final center of gravity value according to an exemplary embodiment of the present disclosure.

As discussed below, the COG determinant module 206 may repeat the determination of center of gravity values and the calculation of the similarity scores for a decreasing percentile of data points that are retrieved from one or more data sets until the move of the center of gravity value(s) indicates that the remaining center of gravity values are smaller than one or more predetermined thresholds. Accordingly, from the determination of the primary center of gravity score(s) to subsequent determinations of the center of gravity score(s) and/or subsequent calculations of the remaining center of gravity values, one or more data points that indicate the categories of occupant demographic data, one or more categories of vehicle dynamic data, and/or one or more categories of vehicle utilization data may shift to show overlap between various respective data points (as represented in FIG. 8, discussed below).

Figure 9:
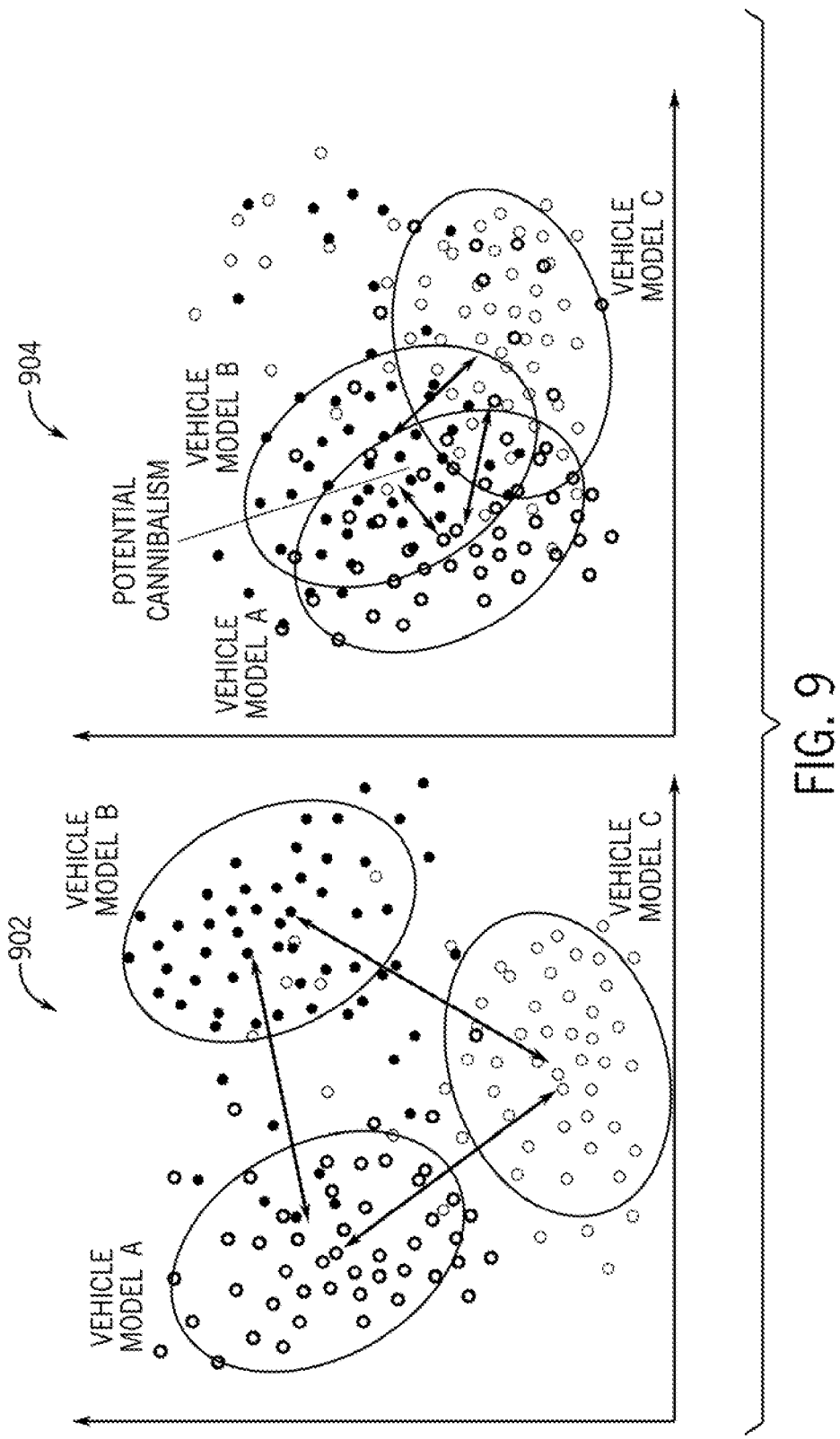
FIG. 9 is an illustrative example of mapping of one or more trends based on centric data points according to an exemplary embodiment of the present disclosure.

In one embodiment, the trend mapping module 208 may be configured to analyze the data points associated final center of gravity values that may be determined for one or more particular vehicle model lineups, vehicle types, and/or additional OEM classifications and may determine overlapping values associated with one or more categories of occupant demographic data, vehicle dynamic data, and/or vehicle utilization data associated with one or more particular vehicle model lineups, vehicle types, and/or additional OEM classifications. Such data may be utilized by the vehicle trend mapping application 108 and/or the OEM 110 to map one or more trends to optimize one or more vehicle model lineups, vehicle types, and/or additional OEM classifications of vehicles that may be manufactured, sold, and/or leased by the OEM 110. Accordingly, the output of the vehicle trend mapping application 108 may enable the OEM 110 to determine potential cannibalism with respect to customer demographic trends, vehicle dynamic usage trends, and/or vehicle utilization trends that may be found amongst one or more particular vehicle model lineups, vehicle types, and/or additional OEM classifications (as represented in FIG. 9, discussed below).

Figure 3A:
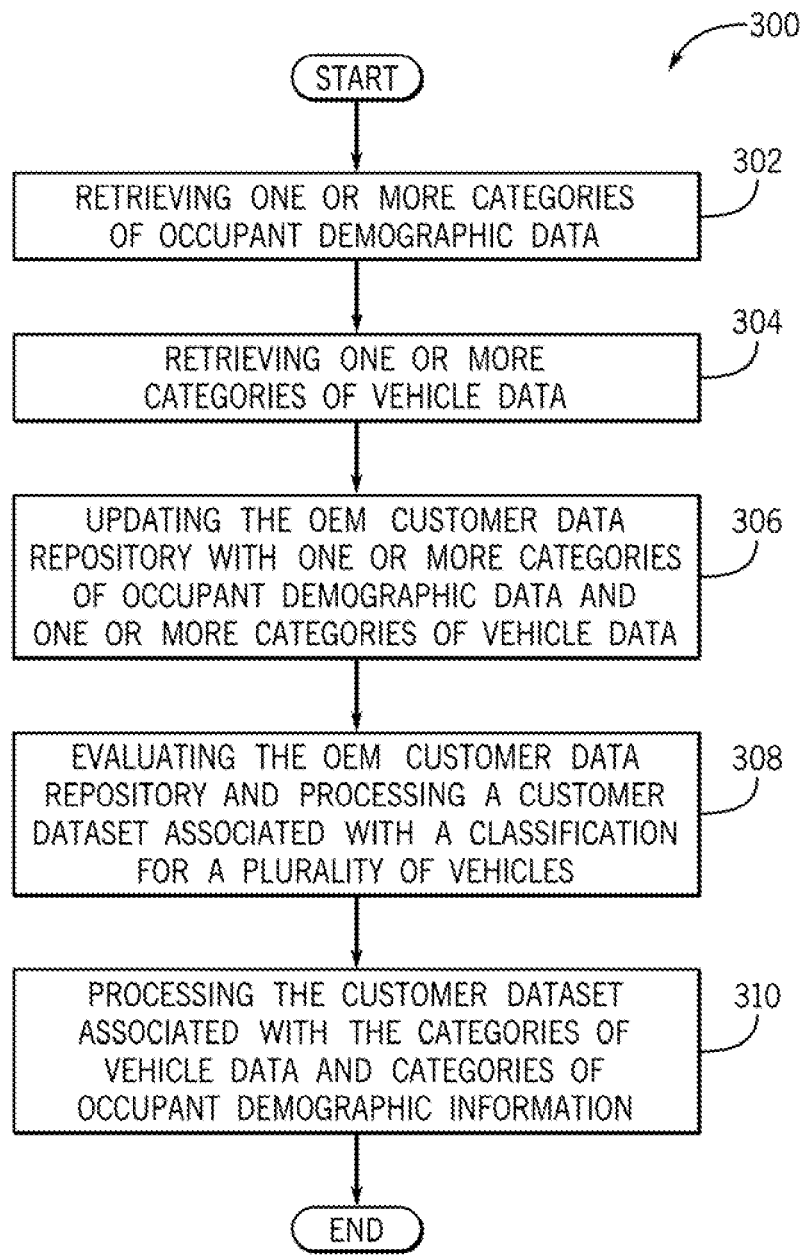
FIG. 3A is a process flow diagram of a method for determining occupant demographic data according to an exemplary embodiment of the present disclosure.

FIG. 3A is a process flow diagram of a method 300 for determining occupant demographic data according to an exemplary embodiment of the present disclosure. FIG. 3A will be described with reference to the components of FIG. 1, through it is to be appreciated that the method 300 of FIG. 3A may be used with additional and/or alternative system components. The method 300 may begin at block 302, wherein the method 300 may include retrieving one or more categories of occupant demographic data.

In an exemplary embodiment, the data reception module 202 of the vehicle trend mapping application 108 may be configured to communicate with the ECU 112 of the vehicle(s) 102 to access the occupant profile 128 stored on the storage unit 118 of the vehicle(s) 102. As discussed above, the occupant profile 128 may be populated with the one or more categories of occupant demographic data based on user input. In one or more embodiments, the one or more categories of occupant demographic data that may include, but may not be limited to, an age of the occupant 104, a gender of the occupant 104, a salary range of the occupant 104, zip code of the occupant 104, number of the household of the occupant 104, and the like.

The method 300 may proceed to block 304, wherein the method 300 may include retrieving one or more categories of vehicle data. In an exemplary embodiment, the data reception module 202 of the vehicle trend mapping application 108 may be configured to communicate with the ECU 112 of the vehicle(s) 102 to access the vehicle profile stored on the storage unit 118 of the vehicle(s) 102. As discussed above, the vehicle profile 130 may be pre-populated by the OEM 110 to be updated with one or more categories of vehicle data that may pertain to the vehicle(s) 102. The one or more categories of vehicle data may include, but may not be limited to, a vehicle identification number (VIN) of the vehicle(s) 102, a model name of the vehicle(s) 102, a model year of the vehicle(s) 102, a model trim level of the vehicle(s) 102, a model engine version of the vehicle(s) 102, a body style of the vehicle(s) 102 and/or additional OEM specific vehicle identification information that may be utilized to identify the vehicle(s) 102.

The method 300 may proceed to block 306, wherein the method 300 may include updating the OEM customer data repository 140 with one or more categories of occupant demographic data and one or more categories of vehicle data. In an exemplary embodiment, the data reception module 202 may be configured to communicate with the processor 132 of the OEM server 106 to update the OEM customer data repository 140 with the one or more categories of occupant demographic data that may be received from the occupant profile 128. Additionally, the data reception module 202 may be configured to communicate with the processor 132 of the OEM server 106 to update the OEM customer data repository 140 with one or more categories of vehicle data that may be received from the vehicle profile 130.

As discussed above, the OEM customer data repository 140 may be configured as a relational database/data store that may include various records that may pertain to one or more categories of occupant demographic data for the occupant 104 of the vehicle(s) 102 and additional vehicles manufactured, sold, and/or leased by the OEM 110. In one embodiment, the records of the OEM customer data repository 140 may be classified based on the vehicle data such that the one or more categories of occupant demographic data included within each record are classified based on the one or more particular vehicle model lineups, vehicle types, and/or additional OEM classifications of vehicles. Accordingly, the OEM customer data repository 140 may include records that may include occupant demographic data for a plurality of occupants of a plurality of vehicles that may be manufactured, sold, and/or leased by the OEM 110 and that may be classified based on the vehicle model, or more particular vehicle model lineups, vehicle types, and/or additional OEM classifications of vehicles.

The method 300 may proceed to block 308, wherein the method 300 may include evaluating the OEM customer data repository 140 and processing a customer dataset associated with a classification for a plurality of vehicles. In an exemplary embodiment, the data classification module 204 of the vehicle utilization data repository 144 may be configured to query the OEM customer data repository 140 to retrieve occupant demographic data that are included in records that are classified based on one or more particular vehicle model lineups, vehicle types, and/or additional OEM classifications. Upon retrieving the occupant demographic data that are based on particular classifications, the data classification module 204 may be configured to process one or more customer datasets that may include one or more categories of occupant demographic data. The one or more categories of occupant demographic data may include numerical data points that may be associated with, but not limited to, an age of the occupant 104, a gender of the occupant 104, a salary range of the occupant 104, zip code of the occupant 104, a number of the household of the occupant 104, and/or additional demographic data categories that may be applicable to the occupant 104.

In one embodiment, the one or more customer datasets may be configured as a data tables and may be classified based on the one or more particular vehicle model lineups, vehicle types, and/or additional OEM classifications as discussed above (e.g., data table is named by the vehicle model lineup). More particularly, the data table(s) may include rows that include the VIN of each of the plurality of vehicles from which occupant demographic data was received by the data reception module 202. Each row may be populated with records that are arranged columns that may be categorized by respective categories of occupant demographic data.

As an illustrative example, as shown in FIG. 3B, the customer dataset 312 may be classified based on a particular vehicle model lineup 314 and may include a data table of data points that may arranged in rows of the VIN number 316 of the plurality of vehicles of the particular vehicle model lineup 314 from which occupant demographic data was received. The customer dataset 312 may include a number of columns 318-322 that may be categorized by respective occupant demographic categories. As shown each record within the customer dataset 312 may include numerical data points that may be associated with the respective occupant demographic categories. As discussed in more detail below, the vehicle trend mapping application 108 may be configured to analyze the customer dataset 312 to retrieve data points to thereby determine center of gravity values for one or more occupant demographic categories for the classification of vehicle model lineup 314.

Figure 4A:
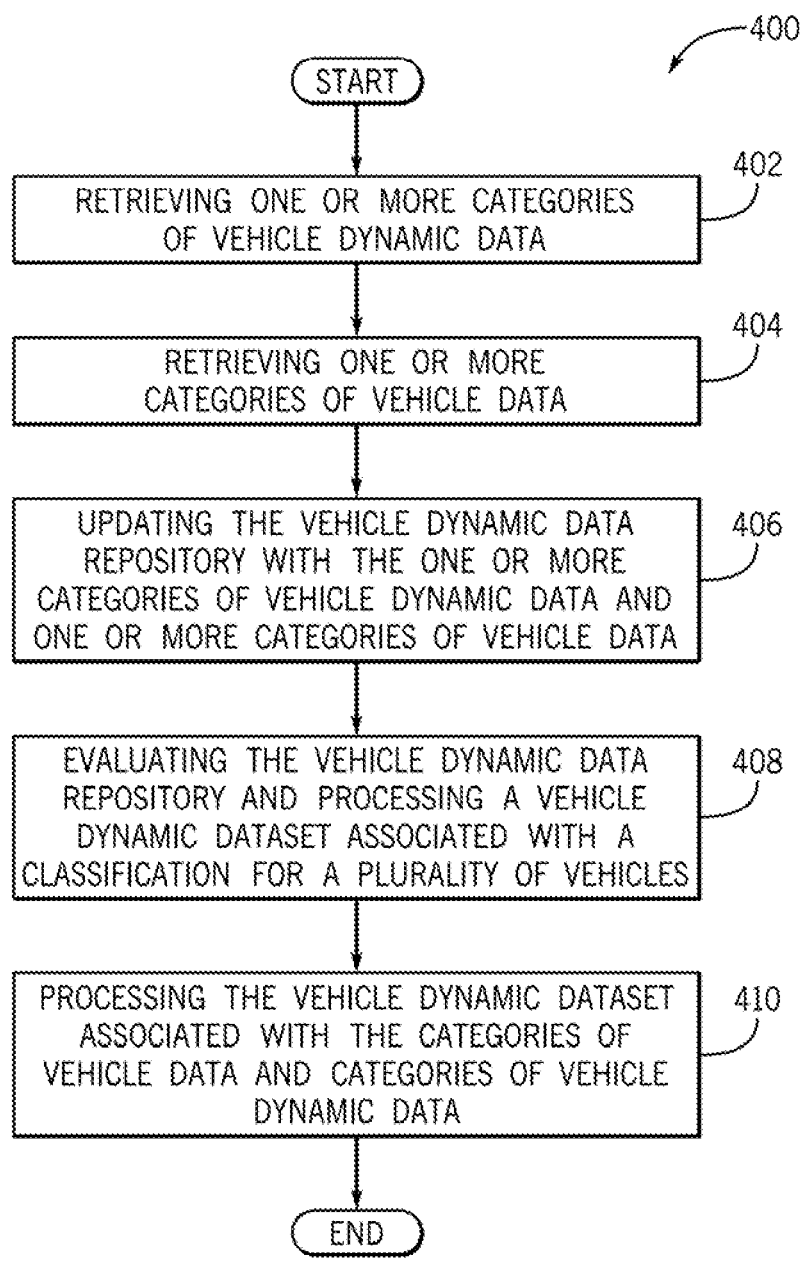
FIG. 4A is a process flow diagram of a method for determining vehicle dynamic data according to an exemplary embodiment of the present disclosure.

FIG. 4A is a process flow diagram of a method 400 for determining vehicle dynamic data according to an exemplary embodiment of the present disclosure. FIG. 4A will be described with reference to the components of FIG. 1, through it is to be appreciated that the method 400 of FIG. 4A may be used with additional and/or alternative system components. The method 400 may begin at block 402, wherein the method 400 may include retrieving one or more categories of vehicle dynamic data.

In an exemplary embodiment, the data reception module 202 may be configured to communicate with the vehicle dynamic sensors 124 of the vehicle(s) 102 to receive vehicle dynamic data as sensed by the vehicle dynamic sensors 124. In one configuration, the data reception module 202 may be configured to receive vehicle dynamic data for a predetermined period of time that may include, but may not be limited to, vehicle speed data, vehicle brake force data, vehicle steering speed data, vehicle steering angle data, vehicle throttle angle data, vehicle acceleration data, and the like.

In one configuration, the data reception module 202 may be configured to compare the numerical values included within each category of vehicle dynamic data to subjective threshold values to determine a number of vehicle dynamic events that occur above, meet, and/or occur below the subjective threshold values. The number of vehicle dynamic events may include a number of events in one or more vehicle dynamic categories that may occur during a predetermined period of time. In one embodiment, upon determining the number of vehicle dynamic events (e.g., speed events) that occur above and/or below occur above, meet, and/or occur below the subjective threshold values, the vehicle trend mapping application 108 may output vehicle dynamic data that includes the number of vehicle dynamic events for one or more categories of vehicle dynamic data.

The method 400 may proceed to block 404, wherein the method 400 may include retrieving one or more categories of vehicle data. In an exemplary embodiment, the data reception module 202 of the vehicle trend mapping application 108 may be configured to communicate with the ECU 112 of the vehicle(s) 102 to access the vehicle profile stored on the storage unit 118 of the vehicle(s) 102 to retrieve one or more categories of vehicle data. As discussed above, the vehicle profile 130 may be pre-populated by the OEM 110 to be updated with one or more categories of vehicle data that may pertain to the vehicle(s) 102.

The method 400 may proceed to block 406, wherein the method 400 may include updating the vehicle dynamic data repository 142 with the one or more categories of vehicle dynamic data and one or more categories of vehicle data. In an exemplary embodiment, the data reception module 202 may be configured to communicate with the processor 132 of the OEM server 106 to update the vehicle dynamic data repository 142 with the one or more categories of vehicle dynamic data that may be received from the vehicle dynamic sensors 124. Additionally, the data reception module 202 may be configured to communicate with the processor 132 of the OEM server 106 to update the vehicle dynamic data repository 142 with one or more categories of vehicle data that may be received from the vehicle profile 130.

As discussed above, the vehicle dynamic data repository 142 may be configured as a relational database/data store that may include various records that may pertain to one or more categories of vehicle dynamic data as determined based on the vehicle dynamic sensors 124 of the vehicle(s) 102 and additional vehicles manufactured, sold, and/or leased by the OEM 110. In one embodiment, the vehicle trend mapping application 108 may be configured to store the one or more categories of vehicle dynamic data upon the vehicle dynamic data repository 142 each time the application 108 retrieves such data from vehicle dynamic sensors 124 of the vehicle(s) 102.

In one embodiment, the records of the vehicle dynamic data repository 142 may be classified based on the vehicle data such that the one or more categories of vehicle dynamic data included within each record are classified based on the vehicle model, or more particular vehicle model lineups, vehicle types, and/or additional OEM classifications of vehicles. Accordingly, the vehicle dynamic data repository 142 may include records that may include vehicle dynamic data for a plurality of vehicles that may be manufactured, sold, and/or leased by the OEM 110 and that may be classified based on the vehicle model, or more particular vehicle model lineups, vehicle types, and/or additional OEM classifications of vehicles.

The method 400 may proceed to block 408, wherein the method 400 may include evaluating the vehicle dynamic data repository 142 and processing a vehicle dynamic dataset associated with a classification for a plurality of vehicles. In an exemplary embodiment, the data classification module 204 of the vehicle utilization data repository 144 may be configured to query the vehicle dynamic data repository 142 to retrieve vehicle dynamic data that are included in records that are classified based on one or more particular vehicle model lineups, vehicle types, and/or additional OEM classifications.

Upon retrieving the vehicle dynamic data that are based on particular classifications, the data classification module 204 may be configured to process one or more vehicle dynamic datasets that may include one or more categories of vehicle dynamic data. The one or more categories of vehicle dynamic data may include numerical data points that may be associated with, but not limited to, vehicle speed data, vehicle brake force data, vehicle steering speed data, vehicle steering angle data, vehicle throttle angle data, vehicle acceleration data, and the like. The data points that may be evaluated within the vehicle dynamic data repository 142 may also include a number of vehicle dynamic events in one or more vehicle dynamic categories that may occur during a predetermined period of time.

In one embodiment, the one or more vehicle dynamic datasets may be configured as a data tables and may be classified based on the one or more particular vehicle model lineups, vehicle types, and/or additional OEM classifications as discussed above (e.g., data table is named by the vehicle model lineup). More particularly, the data table(s) may include rows that include the VIN of each of the plurality of vehicles from which vehicle dynamic data was received by the data reception module 202. Each row may be populated with records that are arranged columns that may be categorized by respective categories of vehicle dynamic data.

As an illustrative example, as shown in FIG. 4B, the vehicle dynamic dataset 412 may be classified based on a particular vehicle model lineup 414 and may include a data table of values that may arranged in rows of the VIN number 416 of the plurality of vehicles of the particular vehicle model lineup 414 from which vehicle dynamic data has been received. The vehicle dynamic dataset 412 may include a number of columns 418-422 that may be categorized by respective vehicle dynamic categories. As shown, each record within the vehicle dynamic dataset 412 may include numerical data points that may be associated with the respective vehicle dynamic data categories that may also include a number of vehicle dynamic events that occur above, meet, and/or occur below subjective threshold values. As discussed in more detail below, the application 108 may be configured to analyze the vehicle dynamic dataset 412 to retrieve the data points to thereby determine center of gravity values for one or more vehicle dynamic categories for the classification of the vehicle model lineup 414.

Figure 5A:
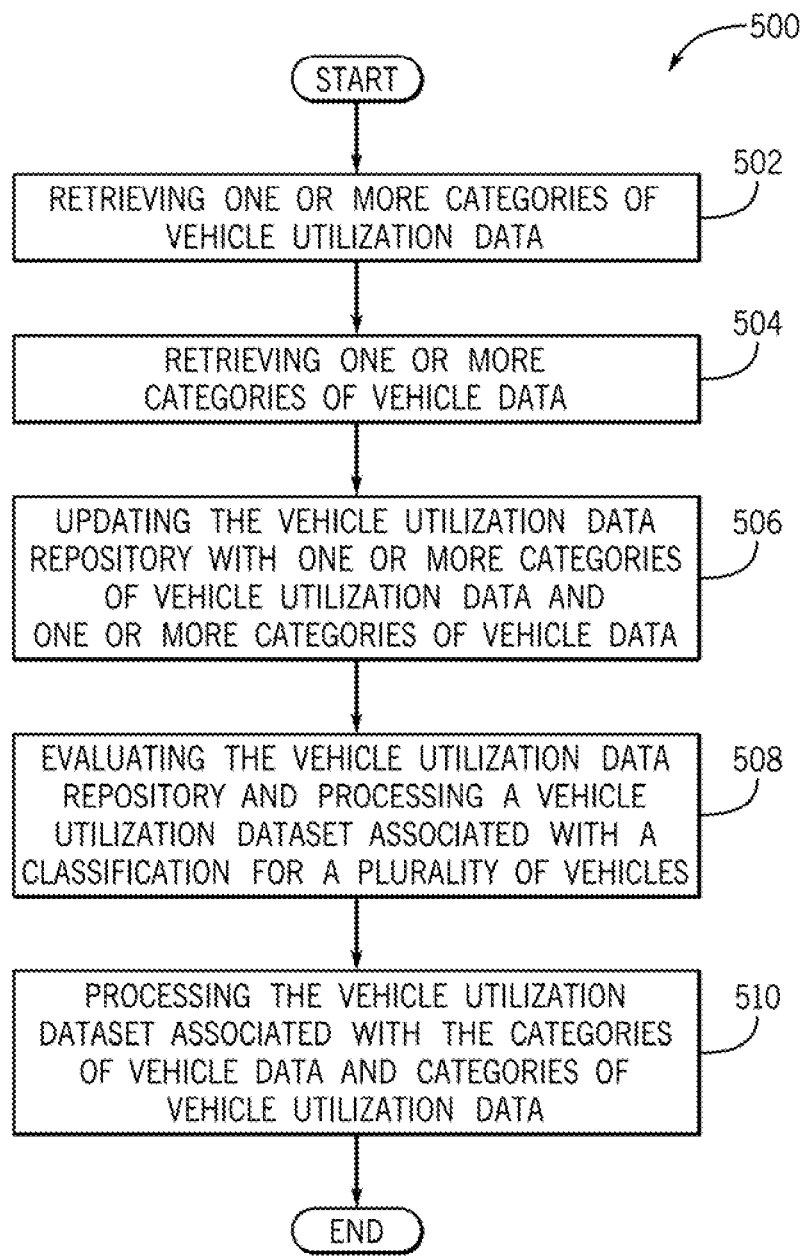
FIG. 5A is a process flow diagram of a method for determining vehicle utilization data according to an exemplary embodiment of the present disclosure.

FIG. 5A is a process flow diagram of a method 500 for determining vehicle utilization data according to an exemplary embodiment of the present disclosure. FIG. 5A will be described with reference to the components of FIG. 1, through it is to be appreciated that the method 500 of FIG. 5A may be used with additional and/or alternative system components. The method 500 may begin at block 502, wherein the method 500 may include retrieving one or more categories of vehicle utilization data.

In an exemplary embodiment, the data reception module 202 may be configured to communicate with the GPS sensors 120 of the vehicle(s) 102 to receive the GPS coordinates of one or more destinations visited by the vehicle(s) 102 during a predetermined period of time. In one configuration, the data reception module 202 may access and analyze the map data 138 that may be stored on the OEM server 106 to determine a destination location of the vehicle(s) 102. In particular, the data reception module 202 may query the map data 138 using the GPS coordinates of the vehicle(s) 102 of the current geo-location of the vehicle(s) 102 when the ignition of the vehicle(s) 102 is determined to be disabled to determine one or more destination location categories that pertain to one or more categories of destinations of the vehicle(s) 102. The destination location categories may pertain to particular point of interest categories (e.g., home, work, restaurant, retail mall, automobile dealer, etc.).

In one embodiment, the data reception module 202 may interpret the one or more destination categories as one or more categories of vehicle utilization data that pertain to the utilization of the vehicle(s) 102. In one or more embodiments, the data reception module 202 may also be configured to communicate with the passenger sensors 122 to determine a number of instances where the number of passengers sensed within the vehicle(s) 102 meet or surpass a passenger threshold value for the predetermined period of time. The data reception module 202 may interpret the number of instances that the number of passengers of the vehicle(s) 102 meet or surpasses one or more passenger threshold values of as one or more categories of vehicle utilization data that pertain to the utilization of the vehicle(s) 102.

The method 500 may proceed to block 504, wherein the method 500 may include retrieving one or more categories of vehicle data. In an exemplary embodiment, the data reception module 202 of the vehicle trend mapping application 108 may be configured to communicate with the ECU 112 of the vehicle(s) 102 to access the vehicle profile stored on the storage unit 118 of the vehicle(s) 102 to retrieve one or more categories of vehicle data. As discussed above, the vehicle profile 130 may be pre-populated by the OEM 110 to be updated with one or more categories of vehicle data that may pertain to the vehicle(s) 102.

The method 500 may proceed to block 506, wherein the method 500 may include updating the vehicle utilization data repository 144 with the one or more categories of vehicle utilization data and one or more categories of vehicle data. In an exemplary embodiment, the data reception module 202 may be configured to communicate with the processor 132 of the OEM server 106 to update the vehicle utilization data repository 144 with the one or more categories of vehicle utilization data and vehicle data that may be received from the GPS sensors 120 and/or the passenger sensors 122. Additionally, the data reception module 202 may be configured to communicate with the processor 132 of the OEM server 106 to update the vehicle dynamic data repository 142 with one or more categories of vehicle data that may be received from the vehicle profile 130.

As discussed above, the vehicle utilization data repository 144 may be configured as a relational database/data store that may include various records that may pertain to one or more categories of vehicle utilization data as determined based on the GPS sensors 120 and/or the passenger sensors 122 of the vehicle(s) 102 and additional vehicles manufactured, sold, and/or leased by the OEM 110. In one embodiment, the vehicle trend mapping application 108 may be configured to store the one or more categories of vehicle utilization data upon the vehicle utilization data repository 144 each time the application 108 retrieves such data from the GPS sensors 120 and/or the passenger sensors 122 of the vehicle(s) 102.

In one embodiment, the records of the vehicle utilization data repository 144 may be classified based on the vehicle data such that the one or more categories of vehicle utilization data included within each record are classified based on the vehicle model, or more particular vehicle model lineups, vehicle types, and/or additional OEM classifications of vehicles. Accordingly, the vehicle utilization data repository 144 may include records that may include vehicle utilization data for a plurality of vehicles that may be manufactured, sold, and/or leased by the OEM 110 and that may be classified based on the vehicle model, or more particular vehicle model lineups, vehicle types, and/or additional OEM classifications of vehicles.

The method 500 may proceed to block 508, wherein the method 500 may include evaluating the vehicle utilization data repository and processing a vehicle utilization dataset associated with a classification for a plurality of vehicles. In an exemplary embodiment, the data classification module 204 of the vehicle utilization data repository 144 may be configured to query the vehicle utilization data repository 144 to retrieve vehicle utilization data that are included in records that are classified based on one or more particular vehicle model lineups, vehicle types, and/or additional OEM classifications.

Upon retrieving the vehicle utilization data that are based on particular classifications, the data classification module 204 may be configured to process one or more vehicle utilization datasets that may include one or more categories of vehicle utilization data. The one or more categories of vehicle utilization data may include numerical data points that may be associated with, but not limited to, destination categories and passenger information associated with the vehicle(s) 102 and additional vehicles manufactured, sold, and/or leased by the OEM 110, and the like. The data points that may be evaluated within the vehicle utilization data repository 144 may also include a number of events in one or more vehicle utilization categories that may occur during a predetermined period of time.

In one embodiment, the one or more vehicle utilization datasets may be configured as data tables and may be classified based on the one or more particular vehicle model lineups, vehicle types, and/or additional OEM classifications of vehicles, as discussed above. More particularly, the data table(s) may be classified by the classification (e.g., data table is named by the vehicle model lineup) and may include rows that include the VIN of each of the plurality of vehicles from which vehicle dynamic data was received by the data reception module 202. Each row may be populated with records that are arranged in each column by each category of vehicle utilization data. Each row may be populated with records that are arranged columns that may be categorized by respective categories of vehicle utilization data.

As an illustrative example, as shown in FIG. 5B, the vehicle utilization dataset 512 may be classified based on a particular vehicle model lineup 514 and may include a data table of values that may arranged in rows of the VIN number 516 of the plurality of vehicles of the particular vehicle model lineup 514 from which vehicle dynamic data has been received. The vehicle utilization dataset 512 may include a number of columns 518-522 that may be categorized by respective vehicle utilization categories. As shown, each record within the vehicle utilization dataset 512 may include numerical data points that may be associated with the respective vehicle utilization data categories that may also include a number of vehicle utilization events that occur above, meet, and/or occur below subjective threshold values. As discussed in more detail below, the application 108 may be configured to analyze the vehicle utilization dataset 512 to retrieve the data points to thereby determine center of gravity values for one or more vehicle utilization categories for the classification of the vehicle model lineup 514.

Figure 6:
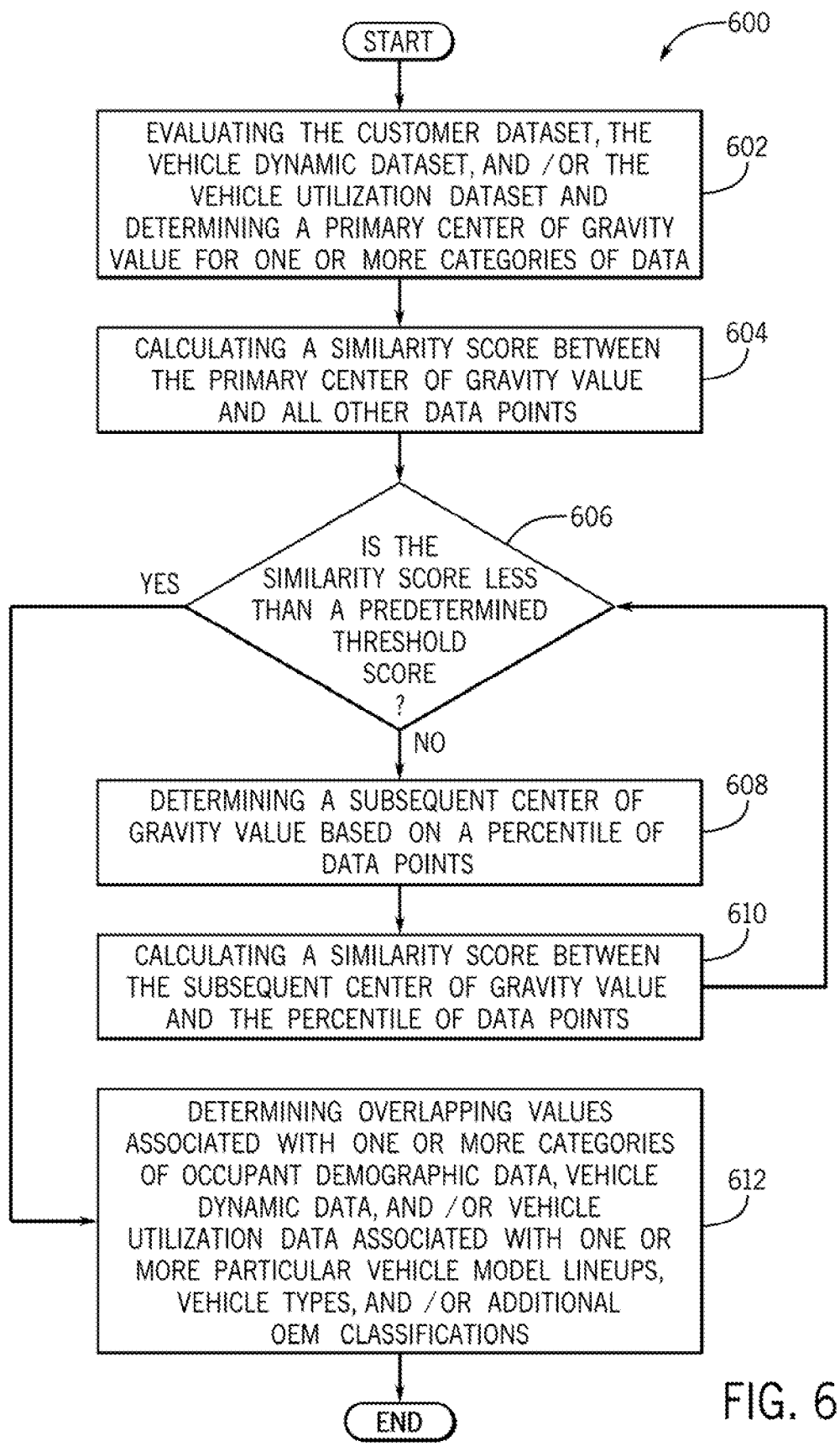
FIG. 6 is a process flow diagram of a method of determining one or more center of gravity values and calculating one or more similarity scores to complete vehicle trend mapping according to an exemplary embodiment of the present disclosure.

FIG. 6 is a process flow diagram of a method 600 of determining one or more center of gravity values and calculating one or more similarity scores to complete vehicle trend mapping according to an exemplary embodiment of the present disclosure. FIG. 6 will be described with reference to the components of FIG. 1, through it is to be appreciated that the method 600 of FIG. 6 may be used with additional and/or alternative system components. The method 600 may begin at block 602, wherein the method 600 may include evaluating the customer dataset, the vehicle dynamic dataset, and/or the vehicle utilization dataset and determining a primary center of gravity value for one or more categories of data.

In an exemplary embodiment, upon processing the customer dataset, the vehicle dynamic dataset, and/or the vehicle utilization dataset, the data classification module 204 may communicate respective data (e.g., pertaining to the data points) of the dataset(s) to the COG determinant module 206. The COG determinant module 206 may be configured to calculate primary center of gravity values for one or more of the categories of occupant demographic data, one or more categories of vehicle dynamic data, and/or one or more categories of vehicle utilization data for one or more classifications of one or more datasets. In particular, the COG determinant module 206 may evaluate the numeric data points that pertain to one or more categories of occupant demographic data, one or more categories of vehicle dynamic data, and/or one or more categories of vehicle utilization data to determine respective primary center of gravity values that pertain to each respective category.

In particular, the primary center of gravity value for each category may be calculated as average mean of all of the (numerical) data points for one or more categories that have been collected for all of the plurality of vehicles and are retrieved from the customer dataset, the vehicle dynamic dataset, and/or the vehicle utilization dataset. Accordingly, the primary center of gravity value may be output as a center of gravity value for all of the plurality of vehicles that may be manufactured, sold, and/or leased by the OEM 110 from which data was retrieved from respective data repositories 140-144 and from which respective datasets were processed.

The method 600 may proceed to block 604, wherein the method 600 may include calculating a similarity score between the primary center of gravity value and all other data points. In an exemplary embodiment, the COG determinant module 206 may be configured to compare the primary center of gravity value for one or more respective categories to the data points as retrieved from the customer dataset, the vehicle dynamic dataset, and/or the vehicle utilization dataset by calculating a similarity score between the primary center of gravity value(s) and all other data points.

In one embodiment, for each category the similarity score may pertain to a distance between the primary center of gravity value and all of the data points included for all of the plurality of vehicles that may be manufactured, sold, and/or leased by the OEM 110 from which data was retrieved from respective data repositories 140-144 and from which respective datasets were processed. In other words, the similarity score may pertain to a distance between the primary center of gravity value and all of the data points included for all of the plurality of vehicles that pertain to a respective occupant demographic category, a respective vehicle dynamic data category, and/or a respective vehicle utilization data category. In an exemplary embodiment, the similarly score may be calculated as:

$$\text{similarity}(A, B) = \frac{A \cdot B}{\|A\| \times \|B\|} = \frac{\sum_{i=1}^{n} A_i \times B_i}{\sqrt{\sum_{i=1}^{n} A_i^2} \times \sqrt{\sum_{i=1}^{n} B_i^2}}$$

The method 600 may proceed to block 606, wherein the method 600 may include determining if the similarly score is less than a predetermined threshold score. In an exemplary embodiment, upon calculating the similarity score between the primary center of gravity value and all other data points (at block 604), the COG determinant module 206 may be configured to compare the similarity score to a predetermined threshold score to determine if the similarity score is less than the predetermined threshold score. The predetermined threshold score may be a score that is determined by the OEM 110 and/or the application 108 based on one or more cycles of data evaluation with respect to one or more categories of occupant demographic data, vehicle dynamic data, and/or vehicle utilization data. Accordingly, the COG determinant module 206 may utilize the predetermined threshold score that may be unique to one or more categories of occupant dynamic data, vehicle dynamic data, and/or vehicle utilization data to be compared against the calculated similarity score.

If it is determined that the similarity score is not less than the predetermined threshold score (at block 606), the method 600 may proceed to block 608, wherein the method 600 may include determining a subsequent center of gravity value on a percentile of data points. In an exemplary embodiment, upon determining that the similarity score is not less than the predetermined threshold score, the COG determinant module 206 may be configured to determine a subsequent center of gravity on a percentile (e.g., 80%) of data points of one or more particular categories that are collected from the customer dataset, the vehicle dynamic dataset, and/or the vehicle utilization dataset.

In particular, the subsequent center of gravity data point may be calculated as average mean of numerical data points that may be calculated for the percentile of the data points for one or more categories that have been collected for a percentile of the plurality of vehicles and are retrieved from the customer dataset, the vehicle dynamic dataset, and/or the vehicle utilization dataset. Accordingly, the subsequent center of gravity value may be output as a center of gravity value for the percentile of the plurality of vehicles that may be manufactured, sold, and/or leased by the OEM 110 from which data was retrieved from respective data repositories 140-144 and from which respective datasets were processed.

The method 600 may proceed to block 610, wherein the method 600 may include calculating a similarity score between the subsequent center of gravity values and the percentile of data points. In an exemplary embodiment, the COG determinant module 206 may be configured to compare the subsequent center of gravity value for one or more respective categories to the percentile of remaining data points for the respective categories as retrieved from the customer dataset, the vehicle dynamic dataset, and/or the vehicle utilization dataset.

In one embodiment, the similarity score may pertain to a distance between the subsequent center of gravity value and the percentile of remaining data points included for the percentile of the plurality of vehicles that may be manufactured, sold, and/or leased by the OEM 110 from which data was retrieved from respective data repositories 140-144 and from which respective datasets were processed. In other words, the similarity score may pertain to a distance between the subsequent center of gravity value and the percentile of data points included for the percentile of the plurality of vehicles that pertain to a respective occupant demographic category, a respective vehicle dynamic data category, and/or a respective vehicle utilization data category.

Upon calculating a similarity score between the subsequent center of gravity value and the percentile of data points, the method 600 may proceed again to block 604, wherein the method 600 may include determining if the similarity score is less than a predetermined threshold score. If it is determined that the similarity score is not less than the predetermined threshold score (at block 604), the method 600 may once again proceed to block 608, wherein the method 600 may include determining a subsequent center of gravity based on a (new) percentile of data points. Accordingly, the COG determinant module 206 may be configured to determine a subsequent center of gravity on a percentile (e.g., 60%) of data points that are collected from the customer dataset, the vehicle dynamic dataset, and/or the vehicle utilization dataset.

The method 600 may once again proceed to block 610, wherein the method 600 may include calculating a similarity score between the subsequent center of gravity value and the percentile of data points. In an exemplary embodiment, upon determining that the similarity score is not less than the predetermined threshold score, the COG determinant module 206 may be configured to determine a subsequent center of gravity on a percentile (e.g., 60%) of data points that are collected from the customer dataset, the vehicle dynamic dataset, and/or the vehicle utilization dataset.

The method 600 may once again proceed to block 606, wherein the method 600 may include determining if the similarly score is less than a predetermined threshold score. It is contemplated that the method 600 may execute numerous iterations of blocks 606 to blocks 610 of the method 600 to determine further subsequent (e.g., fourth, fifth, sixth) center of gravity values and similarity scores on decreasing percentiles (e.g., 50%, 40%, 30%) of data points until the similarity score is determined to be smaller than a predetermined threshold. Accordingly, as shown in the illustrative example of FIG. 8, the center of gravity values from a primary determination 802 of the primary center of gravity value to the final determination 804 of the final center of gravity value for a particular category of occupant demographic data, vehicle dynamic data, and/or vehicle utilization data may allow the shifting of center of gravity values to a more centric value that may signify a core trend(s) for one or more particular vehicle model lineups, vehicle types, and/or additional OEM classifications that may further analyzed by the application 108 and/or the OEM 110.

Referring again to block 606 of the method 600 of FIG. 6, if it is determined that the similarity score is less than the predetermined threshold score, the method 600 may proceed to block 612, wherein the method 600 may include determining overlapping values associated with one or more categories of occupant demographic data, vehicle dynamic data, and/or vehicle utilization data associated with one or more particular vehicle model lineups, vehicle types, and/or additional OEM classifications. As discussed above, the center of gravity values may be determined for data points that are retrieved from customer datasets, vehicle dynamic datasets, and/or vehicle utilization datasets that are classified by one or more particular vehicle model lineups, vehicle types, and/or additional OEM classifications.

In one embodiment, upon determining a final center of gravity value for one or more respective categories of occupant demographic data, vehicle dynamic data, and/or vehicle utilization data that are classified by one or more particular vehicle model lineups, vehicle types, and/or additional OEM classifications, the COG determinant module 206 may communicate the final center of gravity value as a centric data point to the trend mapping module 208. The trend mapping module 208 may be configured to analyze the centric data points that may be associated with one or more categories of vehicle dynamic data, one or more categories of vehicle utilization data, and/or one or more categories of occupant demographic data and may determine overlapping centric data points associated with one or more categories of occupant demographic data, vehicle dynamic data, and/or vehicle utilization data between one or more particular vehicle model lineups, vehicle types, and/or additional OEM classifications.

Such data may be utilized by the OEM 110 to map one or more trends to optimize one or more vehicle model lineups, vehicle types, and/or additional OEM classifications of the plurality of vehicles that may be manufactured, sold, and/or leased by the OEM 110. In one configuration, the trend mapping module 208 may be configured to output data directly to the OEM 110 in the form of one or more overlapping centric data points (e.g., values), associated categories of data, and associated vehicle model lineups, vehicle types, and/or additional OEM classifications. Accordingly, the output of the trend mapping module 208 may enable the OEM 110 to determine potential cannibalism with respect to customer demographic trends, vehicle dynamic usage trends, and/or vehicle utilization trends that may be found amongst one or more particular vehicle model lineups, vehicle types, and/or additional OEM classifications.

Figure 7:
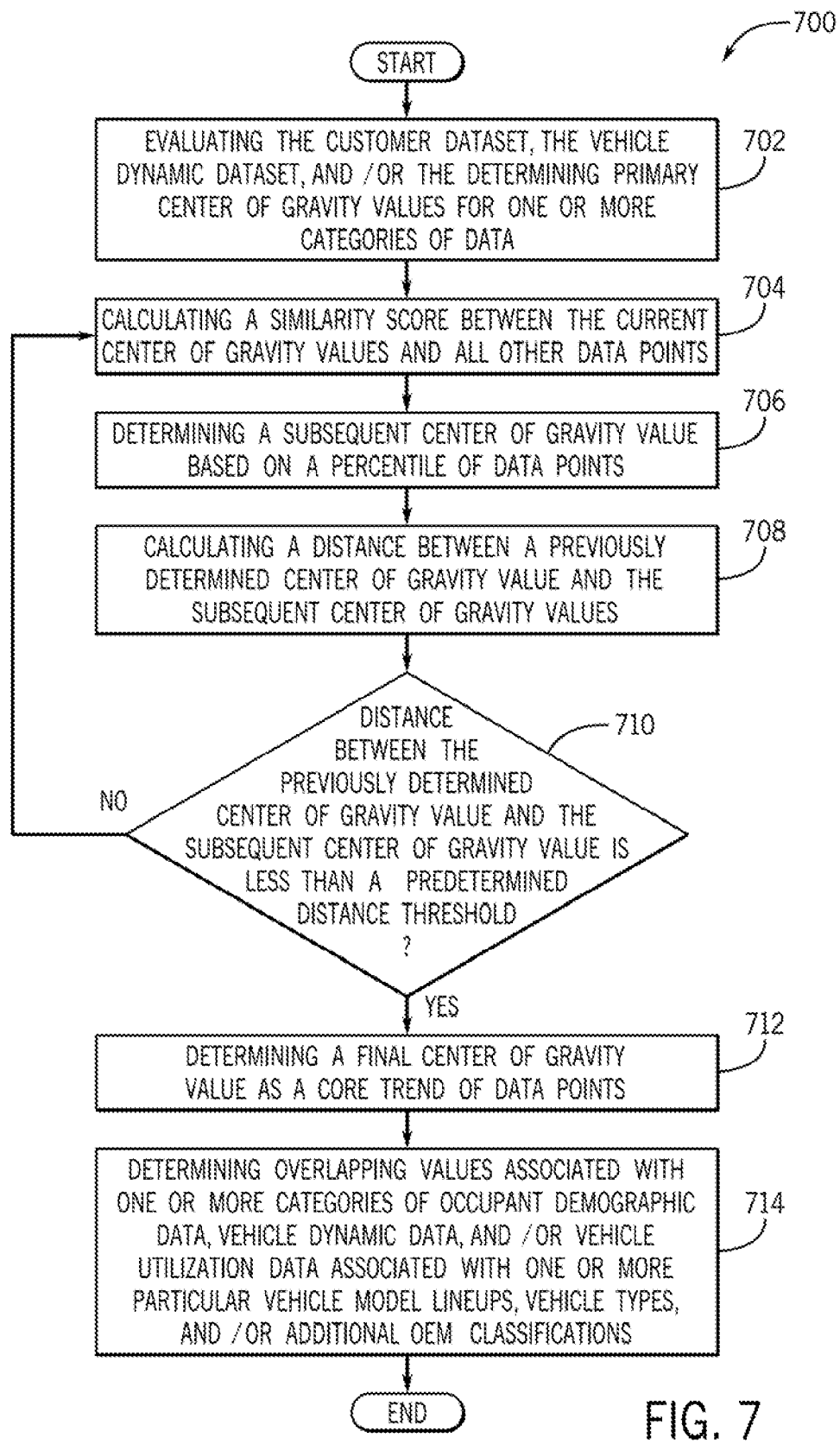
FIG. 7 is process flow diagram of a method of determining one or more center of gravity values and comparing a distance between previous center of gravity values to subsequent center of gravity values to complete vehicle trend mapping according to an exemplary embodiment of the present disclosure.

FIG. 7 is a process flow diagram of a method 700 of determining one or more center of gravity values and comparing a distance between previous center of gravity values to subsequent center of gravity values to complete vehicle trend mapping according to an exemplary embodiment of the present disclosure. FIG. 7 will be described with reference to the components of FIG. 1, through it is to be appreciated that the method 700 of FIG. 7 may be used with additional and/or alternative system components.

The method 700 may begin at block 702, wherein the method 700 may include evaluating the customer dataset, the vehicle dynamic dataset, and/or the vehicle utilization dataset and determining a primary center of gravity value for one or more categories of data. In an exemplary embodiment, upon processing the customer dataset, the vehicle dynamic dataset, and/or the vehicle utilization dataset, the data classification module 204 may communicate respective data (e.g., pertaining to the data points) of the dataset(s) to the COG determinant module 206. The COG determinant module 206 may be configured to calculate primary center of gravity values for one or more of the categories of occupant demographic data, one or more categories of vehicle dynamic data, and/or one or more categories of vehicle utilization data for one or more classifications of one or more datasets. In particular, the COG determinant module 206 may evaluate the numeric data points that pertain to one or more categories of occupant demographic data, one or more categories of vehicle dynamic data, and/or one or more categories of vehicle utilization data to determine respective primary center of gravity values that pertain to each respective category.

In particular, the primary center of gravity value for each category may be calculated as average mean of all of the (numerical) data points for one or more categories that have been collected for all of the plurality of vehicles and are retrieved from the customer dataset, the vehicle dynamic dataset, and/or the vehicle utilization dataset. Accordingly, the primary center of gravity value may be output as a center of gravity value for all of the plurality of vehicles that may be manufactured, sold, and/or leased by the OEM 110 from which data was retrieved from respective data repositories 140-144 and from which respective datasets were processed.

The method 700 may proceed to block 704, wherein the method 700 may include calculating a similarity score between the current center of gravity value and all other data points. In an exemplary embodiment, the COG determinant module 206 may be configured to compare the primary center of gravity value for one or more respective categories to the data points as retrieved from the customer dataset, the vehicle dynamic dataset, and/or the vehicle utilization dataset by calculating a similarity score between the primary center of gravity value(s) and all other data points.

As discussed above, for each category the similarity score may pertain to a distance between the primary center of gravity value and all of the data points included for all of the plurality of vehicles that may be manufactured, sold, and/or leased by the OEM 110 from which data was retrieved from respective data repositories 140-144 and from which respective datasets were processed.

The method 700 may proceed to block 706, wherein the method 700 may include determining a subsequent center of gravity value based on a percentile of data points. In an exemplary embodiment, the COG determinant module 206 may be configured to determine a subsequent center of gravity on a percentile (e.g., 80%) of data points of one or more particular categories that are collected from the customer dataset, the vehicle dynamic dataset, and/or the vehicle utilization dataset. In particular, the subsequent center of gravity data point may be calculated as average mean of numerical data points that may be calculated for the percentile of the data points for one or more categories that have been collected for a percentile of the plurality of vehicles and are retrieved from the customer dataset, the vehicle dynamic dataset, and/or the vehicle utilization dataset. Accordingly, the subsequent center of gravity value may be output as a center of gravity value for the percentile of the plurality of vehicles that may be manufactured, sold, and/or leased by the OEM 110 from which data was retrieved from respective data repositories 140-144 and from which respective datasets were processed.

The method 700 may proceed to block 708, wherein the method 700 may include calculating a distance between a previously determined center of gravity value and the subsequent center of gravity value. In one embodiment, the distance may be calculated as a differential value that represents the delta between the (last) previously determined center of gravity value and the (present) subsequently determined center of gravity value for one or more categories of data. For example the distance may be calculated between the primary center of gravity value (determined at block 702) and the subsequent center of gravity value (determined at block 706).

The method 700 may proceed to block 710, wherein the method 700 may include determining if the distance between the previously determined center of gravity value and the subsequent center of gravity value is less than a predetermined distance threshold. In one configuration, the COG determinant module 206 may be configured to compare the calculated distance between the previously determined center of gravity value and the subsequent center of gravity value to the predetermined distance threshold to determine if the distance between center of gravity values is less than the predetermined distance threshold. The predetermined distance threshold may be a predetermined differential value that is determined by the OEM 110 and/or the application 108 based on one or more cycles of data evaluation with respect to one or more categories of occupant demographic data, vehicle dynamic data, and/or vehicle utilization data. Accordingly, the COG determinant module 206 may utilize the predetermined distance threshold that may be unique to one or more categories of occupant dynamic data, vehicle dynamic data, and/or vehicle utilization data to be compared against the calculated distance between previously determined center of gravity value and the subsequent center of gravity value.

If it is determined that the calculated distance between the previously determined center of gravity and the subsequent center of gravity is not less than the predetermined distance threshold, the method 700 may go back to block 704, wherein the method 700 may include calculating a similarity score between the current center of gravity value and all other data points. The method 700 may once again proceed to block 706, wherein the method 700 may include determining another subsequent center of gravity value based on a percentile of data points. The method 700 may once again proceed to block 708, wherein the method 700 may include calculating a distance between a previously determined center of gravity value and the subsequent center of gravity value. In one embodiment, the distance may be calculated as a differential value that represents that delta between the (last) previously determined center of gravity value and the (present) subsequently determined center of gravity value for one or more categories of data. For example the distance may be calculated between the prior center of gravity value (determined at block 706 during the prior execution iteration of block 706) and the subsequent center of gravity value (determined during the current execution iteration of block 706).

The method 700 may proceed again to block 708, wherein the method 700 once again includes calculating a distance between a previously determined center of gravity value and the subsequent center of gravity value. The method 700 may once again proceed to block 710, wherein the method 700 once again includes determining if the distance between the previously determined center of gravity value and the subsequent center of gravity value is less than a predetermined distance threshold. In one configuration, the COG determinant module 206 may be configured to compare the calculated distance between the previously determined center of gravity value and the subsequent center of gravity value to the predetermined distance threshold to determine if the distance between center of gravity values is less than the predetermined distance threshold.

It is contemplated that the method 700 may execute numerous iterations of blocks 704-710 of the method 700 to determine further subsequent (e.g., fourth, fifth, sixth) center of gravity values, similarity scores, and distances between previously determined center of gravity values and subsequent center of gravity values on decreasing percentiles (e.g., 50%, 40%, 30%) of data points until the distance between a previously determined center of gravity value and a subsequent center of gravity value is determined to be smaller than the predetermined distance threshold.

Referring again to block 710 of the method 700 of FIG. 7, if it is determined that the distance between the previously determined center of gravity value and the subsequent center of gravity value is less than a predetermined distance threshold, the method 700 may proceed to block 712, wherein the method 700 may include determining a final center of gravity value as a core trend of data points. In an exemplary embodiment, the COG determinant module 206 may be configured to calculate primary center of gravity values for one or more of the categories of occupant demographic data, one or more categories of vehicle dynamic data, and/or one or more categories of vehicle utilization data for one or more classifications of one or more datasets for a remaining subset percentile of data points to determine the core trend of the data points.

Accordingly, as shown in the illustrative example of FIG. 8, the center of gravity values from a primary determination 802 of the primary center of gravity value to the final determination 804 of the final center of gravity value for a particular category of occupant demographic data, vehicle dynamic data, and/or vehicle utilization data may allow the shifting of center of gravity values to a more centric value that may signify a core trend(s) for one or more particular vehicle model lineups, vehicle types, and/or additional OEM classifications that may further analyzed by the application 108 and/or the OEM 110.

The method 700 may proceed to block 714, wherein the method 700 may include determining overlapping values associated with one or more categories of occupant demographic data, vehicle dynamic data, and/or vehicle utilization data associated with one or more particular vehicle model lineups, vehicle types, and/or additional OEM classifications. As discussed above, the center of gravity values may be determined for data points that are retrieved from customer datasets, vehicle dynamic datasets, and/or vehicle utilization datasets that are classified by one or more particular vehicle model lineups, vehicle types, and/or additional OEM classifications.

In one embodiment, upon determining a final center of gravity value (as determined at block 710) for one or more respective categories of occupant demographic data, vehicle dynamic data, and/or vehicle utilization data that are classified by one or more particular vehicle model lineups, vehicle types, and/or additional OEM classifications, the COG determinant module 206 may communicate the final center of gravity value as a centric data point to the trend mapping module 208. The trend mapping module 208 may be configured to analyze the centric data points that may be associated with one or more categories of vehicle dynamic data, one or more categories of vehicle utilization data, and/or one or more categories of occupant demographic data and may determine overlapping centric data points associated with one or more categories of occupant demographic data, vehicle dynamic data, and/or vehicle utilization data between one or more particular vehicle model lineups, vehicle types, and/or additional OEM classifications.

Such data may be utilized by the OEM 110 to map one or more trends to optimize one or more vehicle model lineups, vehicle types, and/or additional OEM classifications of the plurality of vehicles that may be manufactured, sold, and/or leased by the OEM 110. In one configuration, the trend mapping module 208 may be configured to output data directly to the OEM 110 in the form of one or more overlapping centric data points (e.g., values), associated categories of data, and associated vehicle model lineups, vehicle types, and/or additional OEM classifications. Accordingly, the output of the trend mapping module 208 may enable the OEM 110 to determine potential cannibalism with respect to customer demographic trends, vehicle dynamic usage trends, and/or vehicle utilization trends that may be found amongst one or more particular vehicle model lineups, vehicle types, and/or additional OEM classifications.

With respect to the illustrative example of FIG. 9 of the mapping of one or more trends, as shown the trend mapping module 208 may be configured to evaluate the centric data points 902 of occupant demographic data, vehicle dynamic data, and/or vehicle utilization data that may be communicated by the COG determinant module 206. The trend mapping module 208 may thereby be determined to determine overlapping centric data points 904 associated with one or more categories of occupant demographic data, vehicle dynamic data, and/or vehicle utilization data associated with one or more categories of occupant demographic data, vehicle dynamic data, and/or vehicle utilization data between one or more particular vehicle model lineups, vehicle types, and/or additional OEM classifications.

As shown in FIG. 9, the OEM 110 may utilize trend mapping data with respect to the one or more data centric data points to further determine overlapping trends that may indicate potential cannibalism between one or more vehicle models lineups, vehicle types, and/or additional OEM classifications of vehicles that may be manufactured, sold, and/or leased by the OEM 110. In particular, the overlapping centric data points may be output of the trend mapping module 208 may enable the OEM 110 to determine potential cannibalism with respect to customer demographic trends, vehicle dynamic usage trends, and/or vehicle utilization trends that may be found amongst one or more particular vehicle model lineups, vehicle types, and/or additional OEM classifications of vehicles. This functionality may allow the OEM 110 to determine one or more vehicle model lineups, vehicle types, and/or other OEM classifications of vehicles that may be consolidated, discontinued, and/or modified to ensure that the OEM 110 is utilizing resources towards demographic trends, vehicle dynamic trends, and vehicle utilization trends of its customers that are utilizing one or more of the plurality of vehicle models.

Figure 10:
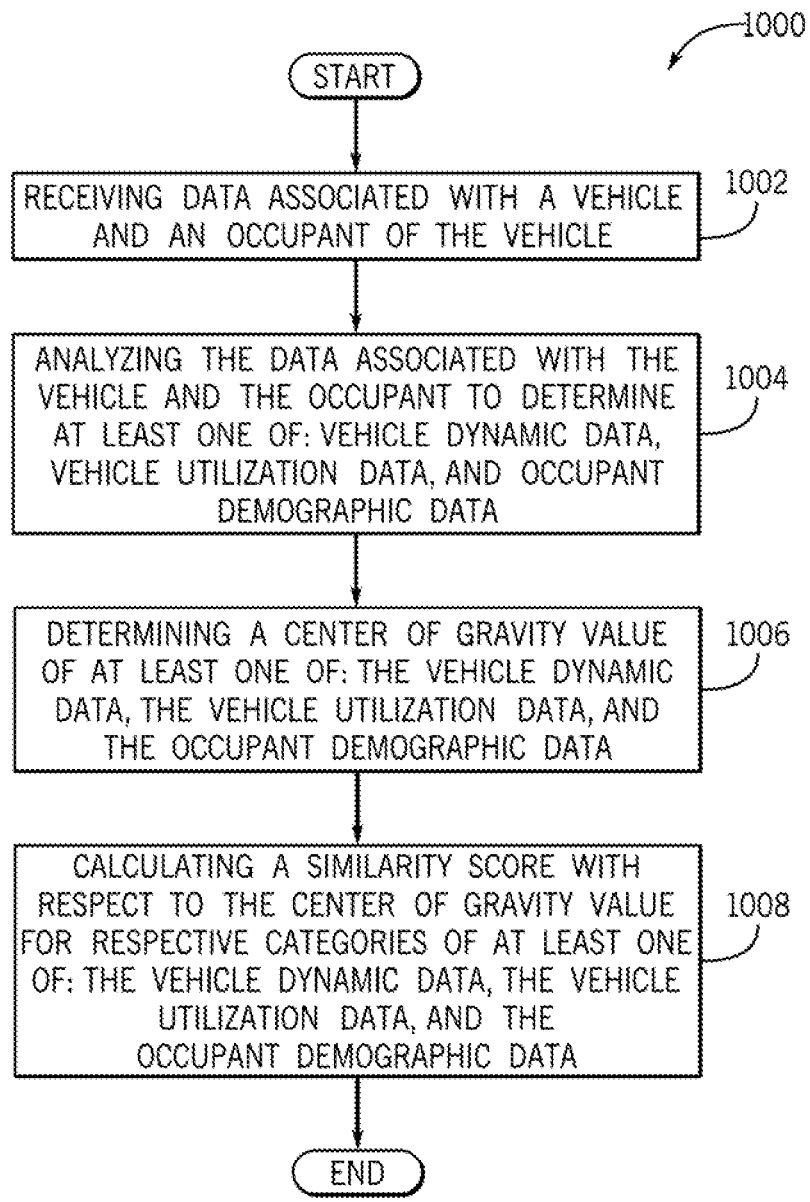
FIG. 10 is a process flow diagram of a method for completing trend mapping using similarity score according to an exemplary embodiment of the present disclosure.

FIG. 10 is a process flow diagram of a method 1000 for completing trend mapping using similarity score according to an exemplary embodiment of the present disclosure. FIG. 10 will be described with reference to the components of FIG. 1, through it is to be appreciated that the method 1000 of FIG. 10 may be used with additional and/or alternative system components. The method 1000 may begin at block 1002, wherein the method 1000 may include receiving data associated with a vehicle(s) 102 and an occupant 104 of the vehicle(s) 102.

The method 1000 may proceed to block 1004, wherein the method 1000 may include analyzing the data associated with the vehicle and the occupant to determine at least one of: vehicle dynamic data, vehicle utilization data, and occupant demographic data. The method 1000 may proceed to block 1006, wherein the method 1000 may include determining a center of gravity value of at least one of: the vehicle dynamic data, the vehicle utilization data, and the occupant demographic data.

The method 1000 may proceed to block 1008, wherein the method 1000 may include calculating a similarity score with respect to the center of gravity value for respective categories of at least one of: the vehicle dynamic data, the vehicle utilization data, and the occupant demographic data. In one embodiment, the center of gravity value and the similarity score are determined and calculated to complete the trend mapping.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for completing trend mapping using similarity scoring, comprising:
   receiving data associated with a vehicle and an occupant of the vehicle;
   analyzing the data associated with the vehicle and the occupant to determine at least one of: vehicle dynamic data, vehicle utilization data, and occupant demographic data;
   determining a center of gravity value of at least one of: the vehicle dynamic data, the vehicle utilization data, and the occupant demographic data; and
   calculating a similarity score with respect to the center of gravity value for respective categories of at least one of: the vehicle dynamic data, the vehicle utilization data, and the occupant demographic data, wherein the center of gravity value and the similarity score are determined and calculated to complete the trend mapping.

2. The computer-implemented method of claim 1, wherein analyzing the data associated with the vehicle and the occupant includes analyzing data stored on an occupant profile stored on the vehicle to determine the occupant demographic data, analyzing data output by vehicle dynamic sensors of the vehicle to determine the vehicle dynamic data, and analyzing data output by at least one of: GPS sensors and passenger sensors of the vehicle to determine the vehicle utilization data.

3. The computer-implemented method of claim 1, wherein determining the center of gravity value includes processing at least one of: a customer data set that includes data points associated with occupant demographic data, a vehicle dynamic data set that includes data points associated with the vehicle dynamic data, and a vehicle utilization data set that includes data points associated with the vehicle utilization data for a plurality of vehicles that are manufactured, sold, or leased by an original equipment manufacturer.

4. The computer-implemented method of claim 3, wherein determining the center of gravity value includes calculating a primary center of gravity value that is based on at least one of: the data points associated with the occupant demographic data, the data points associated with the vehicle dynamic data, and the data points associated with the vehicle utilization data for the plurality of vehicles.

5. The computer-implemented method of claim 4, wherein calculating the similarity score with respect to the center of gravity value includes calculating the similarity score that indicates a distance between the primary center of gravity value and at least one of: the data points associated with the occupant demographic data, the data points associated with the vehicle dynamic data, and the data points associated with the vehicle utilization data for the plurality of vehicles.

6. The computer-implemented method of claim 5, wherein calculating the similarity score with respect to the center of gravity value includes determining if the similarity score is below a predetermined threshold score to determine a centric data point that is associated with at least one of: the occupant demographic data, the vehicle dynamic data, and the vehicle utilization data.

7. The computer-implemented method of claim 6, wherein determining the center of gravity value includes determining that the similarity score is equal to or above the predetermined threshold score and calculating a subsequent center of gravity value that is based on at least one of: the data points associated with the occupant demographic data, the data points associated with the vehicle dynamic data, and the data points associated with the vehicle utilization data for a percentile of the plurality of vehicles.

8. The computer-implemented method of claim 7, wherein calculating the similarity score with respect to the center of gravity value includes calculating the similarity score that indicates a distance between the subsequent center of gravity value and at least one of: the data points associated with the occupant demographic data, the data points associated with the vehicle dynamic data, and the data points associated with the vehicle utilization data for the percentile of the plurality of vehicles.

9. The computer-implemented method of claim 8, further including determining the centric data point that is associated with at least one of: the occupant demographic data, the vehicle dynamic data, and the vehicle utilization data upon determining that the similarity score is below the predetermined threshold score, wherein the centric data point is compared against at least one additional centric data point of at least one: an additional vehicle model lineup, an additional vehicle type, and an additional classification of vehicles by the original equipment manufacturer to complete the trend mapping.

10. A system for completing trend mapping using similarity scoring, comprising:
a memory storing instructions when executed by a processor cause the processor to:
receive data associated with a vehicle and an occupant of the vehicle;
analyze the data associated with the vehicle and the occupant to determine at least one of: vehicle dynamic data, vehicle utilization data, and occupant demographic data;
determine a center of gravity value of at least one of: the vehicle dynamic data, the vehicle utilization data, and the occupant demographic data; and
calculate a similarity score with respect to the center of gravity value for respective categories of at least one of: the vehicle dynamic data, the vehicle utilization data, and the occupant demographic data, wherein the center of gravity value and the similarity score are determined and calculated to complete the trend mapping.

11. The system of claim 10, wherein analyzing the data associated with the vehicle and the occupant includes analyzing data stored on an occupant profile stored on the vehicle to determine the occupant demographic data, analyzing data output by vehicle dynamic sensors of the vehicle to determine the vehicle dynamic data, and analyzing data output by at least one of: GPS sensors and passenger sensors of the vehicle to determine the vehicle utilization data.

12. The system of claim 10, wherein determining the center of gravity value includes processing at least one of: a customer data set that includes data points associated with occupant demographic data, a vehicle dynamic data set that includes data points associated with the vehicle dynamic data, and a vehicle utilization data set that includes data points associated with the vehicle utilization data for a plurality of vehicles that are manufactured, sold, or leased by an original equipment manufacturer.

13. The system of claim 12, wherein determining the center of gravity value includes calculating a primary center of gravity value that is based on at least one of: the data points associated with the occupant demographic data, the data points associated with the vehicle dynamic data, and the data points associated with the vehicle utilization data for the plurality of vehicles.

14. The system of claim 13, wherein calculating the similarity score with respect to the center of gravity value includes calculating the similarity score that indicates a distance between the primary center of gravity value and at least one of: the data points associated with the occupant demographic data, the data points associated with the vehicle dynamic data, and the data points associated with the vehicle utilization data for the plurality of vehicles.

15. The system of claim 14, wherein calculating the similarity score with respect to the center of gravity value includes determining if the similarity score is below a predetermined threshold score to determine a centric data point that is associated with at least one of: the occupant demographic data, the vehicle dynamic data, and the vehicle utilization data.

16. The system of claim 15, wherein determining the center of gravity value includes determining that the similarity score is equal to or above the predetermined threshold score and calculating a subsequent center of gravity value that is based on at least one of: the data points associated with the occupant demographic data, the data points associated with the vehicle dynamic data, and the data points associated with the vehicle utilization data for a percentile of the plurality of vehicles.

17. The system of claim 16, wherein calculating the similarity score with respect to the center of gravity value includes calculating the similarity score that indicates a distance between the subsequent center of gravity value and at least one of: the data points associated with the occupant demographic data, the data points associated with the vehicle dynamic data, and the data points associated with the vehicle utilization data for the percentile of the plurality of vehicles.

18. The system of claim 17, further including determining the centric data point that is associated with at least one of: the occupant demographic data, the vehicle dynamic data, and the vehicle utilization data upon determining that the similarity score is below the predetermined threshold score, wherein the centric data point is compared against additional centric data point of at least one: an additional vehicle model lineup, an additional vehicle type, and an additional classification of vehicles by the original equipment manufacturer to complete the trend mapping.

19. A non-transitory computer readable storage medium storing instructions that when executed by a computer, which includes a processor perform a method, the method comprising:
receiving data associated with a vehicle and an occupant of the vehicle;
analyzing the data associated with the vehicle and the occupant to determine at least one of: vehicle dynamic data, vehicle utilization data, and occupant demographic data;
determining a center of gravity value of at least one of: the vehicle dynamic data, the vehicle utilization data, and the occupant demographic data; and
calculating a similarity score with respect to the center of gravity value for respective categories of at least one of: the vehicle dynamic data, the vehicle utilization data, and the occupant demographic data, wherein the center of gravity value and the similarity score are determined and calculated to complete trend mapping.

20. The non-transitory computer readable storage medium of claim 19, further including determining a centric data point that is associated with at least one of: the occupant demographic data, the vehicle dynamic data, and the vehicle utilization data upon determining that the similarity score is below a predetermined threshold score, wherein the centric data point is compared against at least one additional centric data point of at least one: an additional vehicle model lineup, an additional vehicle type, and an additional classification of vehicles by the original equipment manufacturer to complete the trend mapping.

* * * * *